(12) United States Patent
Yaguchi

(10) Patent No.: US 7,199,540 B2
(45) Date of Patent: Apr. 3, 2007

(54) MOTOR DRIVE APPARATUS HAVING OSCILLATION-REDUCING CONTROL FUNCTION FOR OUTPUT TORQUE

(75) Inventor: Hideaki Yaguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/223,917

(22) Filed: Sep. 13, 2005

(65) Prior Publication Data
US 2006/0076914 A1    Apr. 13, 2006

(30) Foreign Application Priority Data
Oct. 7, 2004    (JP) ............................ 2004-295076
Nov. 22, 2004   (JP) ............................ 2004-337804

(51) Int. Cl.
*H02P 7/00* (2006.01)
(52) U.S. Cl. ...................... 318/432; 318/599; 318/811
(58) Field of Classification Search ..................... None
See application file for complete search history.

(56) References Cited
U.S. PATENT DOCUMENTS
5,587,891 A * 12/1996 Nakata et al. ................ 363/41

| 7,012,389 B2* | 3/2006 | Kobayashi et al. ......... 318/254 |
| 7,049,779 B2* | 5/2006 | Chen et al. .................. 318/599 |
| 2005/0046369 A1* | 3/2005 | Kobayashi et al. ......... 318/432 |
| 2006/0119297 A1* | 6/2006 | Okamura et al. ............. 318/17 |

FOREIGN PATENT DOCUMENTS
JP      09-238492       9/1997
JP      2000-358393    12/2000

* cited by examiner

*Primary Examiner*—Lincoln Donovan
*Assistant Examiner*—Renata McCloud
(74) *Attorney, Agent, or Firm*—Kenyon & Kenyon LLP

(57) ABSTRACT

Under oscillation-reducing control executed while PWM control is performed, an oscillation-reducing torque that is opposite in phase to a varying component of the motor revolution number is generated and, a final torque command value that is the sum of the oscillation-reducing torque and a torque command value is used to drive an AC motor. In a transition state where the PWM control mode is switched to overmodulation control mode, the oscillation-reducing torque that is determined by multiplying an oscillation-reducing torque by a correction coefficient that varies depending on a modulation factor gradually decreases as the correction coefficient decreases and substantially becomes zero when the control mode is switched. Thus, the oscillation-reducing torque has no stepped portion that occurs in the oscillation-reducing torque when the control mode is switched. Thus, oscillations in output torque of the AC motor can be reduced.

15 Claims, 14 Drawing Sheets

⬆ : CHANGE OF TORQUE COMMAND VALUE   ⇧ : CHANGE OF DRIVE TORQUE

MOTOR DRIVE APPARATUS HAVING OSCILLATION-REDUCING CONTROL FUNCTION FOR OUTPUT TORQUE

This nonprovisional application is based on Japanese Patent Application Nos. 2004-295076 and 2004-337804 filed with the Japan Patent Office on Oct. 7, 2004 and Nov. 22, 2004, respectively, the entire contents of which are hereby incorporated by reference.

BACKGROUND OF THE INVENTION

1. Field of the Invention

The present invention relates to a motor drive apparatus, and particularly to a motor drive apparatus having an oscillation-reducing control function for output torque.

2. Description of the Background Art

Hybrid vehicles and electric vehicles have recently been of great interest as environment-friendly motor vehicles. A hybrid vehicle has, as its motive power sources, a DC (direct current) power supply, an inverter and a motor driven by the inverter in addition to a conventional engine. More specifically, the engine is driven to secure the motive power source and a DC voltage from the DC power supply is converted by the inverter into an AC (alternating current) voltage to be used for rotating the motor and thereby securing the motive power source as well.

An electric vehicle refers to a motor vehicle that has, as its motive power sources, a DC power supply, an inverter and a motor driven by the inverter.

A motor drive apparatus that is mounted on such a hybrid vehicle or electric vehicle employs an oscillation-reducing control technique that matches an output torque of the motor with a torque command value with high precision to reduce vibrations of the vehicle caused by an error in torque control.

FIG. 19 is a schematic block diagram of an electric-current control apparatus for an AC motor disclosed for example in Japanese Patent Laying-Open No. 09-238492. The current control apparatus shown here employs a so-called vector control technique using a $\gamma$-$\delta$ coordinate system with which the voltage and current of the motor stator and rotor can be represented by straight lines.

Referring to FIG. 19, an induction motor 102 is driven by three-phase AC current from an inverter 111.

A vector control command value calculator 101 receives, as an input, torque command value T* provided from an external component to calculate and output slip angular velocity command value $\omega se^*$, exciting current command value $i\gamma s^*$ and torque current command value $i\delta s^*$.

Slip angular velocity command value $\omega se^*$ that is output from vector control command value calculator 101 is input to an integrator 115. Exciting current command value $i\gamma s^*$ and torque current command value $i\delta s^*$ are input to a current controller 109.

Integrator 115 calculates the integral of slip angular velocity command value $\omega se^*$ to determine slip angular phase $\theta se$ and outputs this slip angular phase $\theta se$ to a power supply angular phase calculator 114 comprised of an adder. A rotational position detector 113 determines rotational angular position $\theta re$ of the rotor of induction motor 102 based on a signal from an encoder 103 and outputs the determined position to power supply angular phase calculator 114.

Power supply angular phase calculator 114 adds rotational angular position $\theta re$ to slip angular phase $\theta se$ to calculate power supply angular phase $\theta$.

A u-phase current sensor 106 detects and outputs u-phase current iu of the stator of induction motor 102 and a v-phase current sensor 107 detects and outputs v-phase current iv of the stator. From these u-phase current iu, v-phase current iv and power supply angular phase $\theta$, a three-to-two phase converter 108 calculates and outputs exciting current $i\gamma s$ and torque current $i\delta s$.

From exciting current command value $i\gamma s^*$ and exciting current $i\gamma s$ as well as torque current command value $i\delta s^*$ and torque current $i\delta s$, respectively, current controller 109 calculates and outputs excitation component voltage command value $v\gamma s^*$ and torque component voltage command value $v\delta s^*$.

A PWM (Pulse Width Modulation) generator 110 uses power supply angular phase $\theta$ to perform two-to-three phase conversion on excitation component voltage command value $v\gamma s^*$ and torque component voltage command value $v\delta s^*$ into a three-phase voltage command value and outputs a three-phase PWM signal to inverter 111. In response to the three-phase PWM signal, inverter 111 supplies to induction motor 102 three-phase AC current (iu, iv, iw).

Regarding the configuration discussed above, rotational angular position $\theta re$, which is a component of power supply angular phase $\theta$ used for the two-to-three phase conversion by PWM generator 110, can be obtained as an updated and accurate value all the time by encoder 103. Therefore, as compared with the case where the power supply angular phase is determined from the rotational angular velocity that requires a predetermined time for measurement and that is large in measurement error when the velocity changes, the motor output torque can be controlled accurately so that the torque is set to a command value. Accordingly, the body longitudinal acceleration due to an error in torque control that causes transient vibrations in the longitudinal direction of the vehicle's body can be reduced.

Further, the vector control is implemented by digital current control. In sampling the rotational angular position and the actual three-phase current, the sum of the sampling value of the rotational angular position and the slip angular phase is calculated to determine a first power supply angular phase. The sum of the rotational angular velocity and the slip angular velocity is calculated to determine the power supply angular velocity. The power supply angular velocity is used to make compensation for the first power supply angular phase and thereby determine a second power supply angular phase that is used to generate the three-phase PWM signal. Thus, variations in control in a transient state can be reduced.

The three-phase PWM signal generated by PWM generator 110 shown in FIG. 19 is a switching signal that is obtained by comparing excitation component voltage command value $v\gamma s^*$ and torque component voltage command value $v\delta s^*$ with a triangular-wave carrier signal. This switching signal can be used to cause elements of inverter 111 to be on/off and thereby obtain an AC output voltage having its average proportional to the amplitude of the voltage command value.

In the PWM control system, in order to cause the elements to be on/off all the time in each cycle of the triangular-wave signal, it is necessary that the amplitude of the voltage command value is smaller than the amplitude of the triangular-wave signal. A resultant problem is that the voltage utilization factor is limited and accordingly a sufficiently high power output cannot be obtained.

As an example of the control system having a higher voltage utilization factor than the PWM control system, a control system that uses a rectangular-wave voltage (rectangular-wave control system) or overmodulation control system is known. The rectangular-wave control system and overmodulation control system use the voltage to the degree that is close to the limitation and thus such systems can increase the motor power output as compared with the PWM control system.

However, the rectangular-wave control system and overmodulation control system are relatively lower in control response than the PWM control system. A resultant problem is that, when a sudden change occurs in torque command value or motor revolution number, an instantaneous drop of the battery is caused for example and accordingly a desired torque cannot be obtained.

In this respect, the PWM control system is advantageous since it has high control response so that torque can be output stably even when a sudden change occurs in load.

Then, with the purpose of increasing the voltage utilization factor for the entire control and controlling the motor stably in the state of transient change where the load suddenly changes, a motor control apparatus that can selectively change the motor control mode between the PWM control and rectangular-wave control is disclosed.

Specifically, Japanese Patent Laying-Open No. 2000-358393 discloses a motor control apparatus that performs control by means of a PWM waveform voltage until the absolute value of a voltage command value of each phase of an AC motor exceeds A/2 (a value equivalent to a battery voltage) and, when the absolute value of the voltage command value becomes equal to or larger than A/2, the control is performed by means of rectangular-wave voltage. Further, when any of respective voltage command values of the phases exceeds the maximum voltage value that can be generated by the inverter, the torque command value is reduced and the voltage command value is calculated again. Furthermore, there is another feature that an ECU for vehicle control is informed of the reduced torque command value.

It is supposed here that, to the motor drive apparatus having such a motor control mode switching function as described above, the above-described oscillation-reducing control is applied.

The oscillation-reducing control controls, as described above, the motor output torque accurately so that the torque matches a command value and reduces variations in control in a transient state. Therefore, as a motor control mode, the PWM control superior in control response shown in FIG. 13 is employed.

It is further supposed here that, according to a voltage command value, the motor control mode is changed from the PWM control to the rectangular-wave control. Under the rectangular-wave control, it is difficult to continue high-precision oscillation-reducing control due to the low control response. Therefore, at the timing when the PWM control is changed to the rectangular-wave control, the motor output torque has its waveform that is not continuous, namely that has a stepped portion. Occurrence of the stepped portion results in vibrations of the vehicle, which discomforts the driver.

SUMMARY OF THE INVENTION

An object of the present invention is to provide a motor drive apparatus that can reduce oscillations of output torque that occur when the motor control mode is changed.

Another object of the invention is to provide a motor drive apparatus having means for applying the oscillation-reducing control for effectively executing the oscillation-reducing control.

In accordance with the present invention, a motor drive apparatus includes: a first drive circuit driving a first motor; and a drive circuit control circuit controlling the first drive circuit so that the first motor outputs a torque according to a requested torque. The drive circuit control circuit includes a control mode switching unit for switching control mode of the first motor between PWM control mode, overmodulation control mode and rectangular-wave control mode, according to a modulation factor of the first drive circuit, and an oscillation-reducing control unit for generating, when the control mode of the first motor is the PWM control mode, an oscillation-reducing torque for reducing oscillations of the torque that is output from the first motor and adding the oscillation-reducing torque to the requested torque to provide the resultant sum as a new requested torque. The control mode switching unit switches the control mode of the first motor from the PWM control mode to the overmodulation control mode in response to the fact that the modulation factor of the first drive circuit exceeds a first predetermined value, and the oscillation-reducing control unit gradually decreases the oscillation-reducing torque in a period in which the modulation factor of the first drive circuit changes from a second predetermined value that is smaller than the first predetermined value to reach the first predetermined value.

Preferably, the oscillation-reducing control unit includes: a generation unit for generating the oscillation-reducing torque based on a varying component of the number of revolutions of the first motor; a first correction unit multiplying the generated oscillation-reducing torque by a first correction coefficient that varies according to the modulation factor of the first drive circuit, for correcting the oscillation-reducing torque; and an addition unit for adding the corrected oscillation-reducing torque to the requested torque to provide the resultant sum as a new requested torque.

Preferably, the first correction coefficient gradually decreases as the modulation factor of the first drive circuit gradually increases from the second predetermined value toward the first predetermined value.

Preferably, the first correction unit has a first correction coefficient map defining the first correction coefficient as gradually decreasing as the modulation factor of the first drive circuit gradually increases, and extracts, from the first correction coefficient map, a value of the first correction coefficient that corresponds to the modulation factor of the first drive circuit for correcting the oscillation-reducing torque.

Preferably, the first motor is a motor generating a drive torque exerted on drive wheels of a vehicle, and the oscillation-reducing control unit further includes a second correction unit multiplying the generated oscillation-reducing torque by a second correction coefficient that varies according to a state of the vehicle, for correcting the oscillation-reducing torque.

Preferably, the oscillation-reducing control unit further includes a vehicle state detection unit for detecting the state of the vehicle based on an amount of variation of the drive torque, and the second correction unit multiplies the generated oscillation-reducing torque by the second correction coefficient that varies according to the amount of variation of the drive torque, for correcting the oscillation-reducing torque.

Preferably, the second correction coefficient increases, under the condition that the amount of variation of the drive torque exceeds a predetermined value, as the amount of variation of the drive torque increases.

Preferably, the second correction coefficient increases stepwise or continuously as the amount of variation of the drive torque increases.

Preferably, the second correction coefficient is set to a relatively large value in a predetermined period starting from the time when the drive torque starts to vary and set to a relatively small value after the predetermined period.

Preferably, the predetermined period corresponds to a period of substantially one cycle of a resonance frequency band of the varying component of the number of revolutions of the first motor.

Preferably, the second correction coefficient is substantially zero when the amount of variation of the drive torque is at most the predetermined value.

Preferably, the second correction coefficient gradually decreases in the predetermined period starting from the time when the amount of variation of the drive torque changes to at most the predetermined value.

Preferably, when the amount of variation of the drive torque is at most the predetermined value, the addition unit provides the requested torque as the new requested torque without performing the addition of the corrected oscillation-reducing torque to the requested torque.

Preferably, the motor drive apparatus further includes a second drive circuit driving a second motor that starts or stops an internal combustion engine. The vehicle state detection unit detects the amount of variation of the drive torque based on at least one of a requested torque of the first drive circuit, a requested torque of the second drive circuit and an amount of variation of a requested torque of the internal combustion engine.

Preferably, the motor drive apparatus further includes a voltage converter performing voltage conversion between a power supply and the first and second drive circuits. The voltage converter steps up a power supply voltage, according to an instruction to start the internal combustion engine, so that the modulation factor of the first drive circuit is at most the first predetermined value. The control mode switching unit switches the control mode of the first motor to the PWM control mode in response to the fact that the modulation factor of the first drive circuit changes to at most the first predetermined value.

According to the present invention, with the configuration of switching the control mode of the AC motor according to the modulation factor, the oscillation-reducing torque generated when the control mode is the PWM control mode is gradually decreased as the control mode is switched from the PWM control mode to the overmodulation control mode. Thus, occurrence of a stepped portion of the output torque can be prevented.

Further, according to the present invention, the oscillation-reducing control is carried out according to the amount of variation of the drive torque and thus the oscillation-reducing control can efficiently be performed to derive its advantages to the maximum degree.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
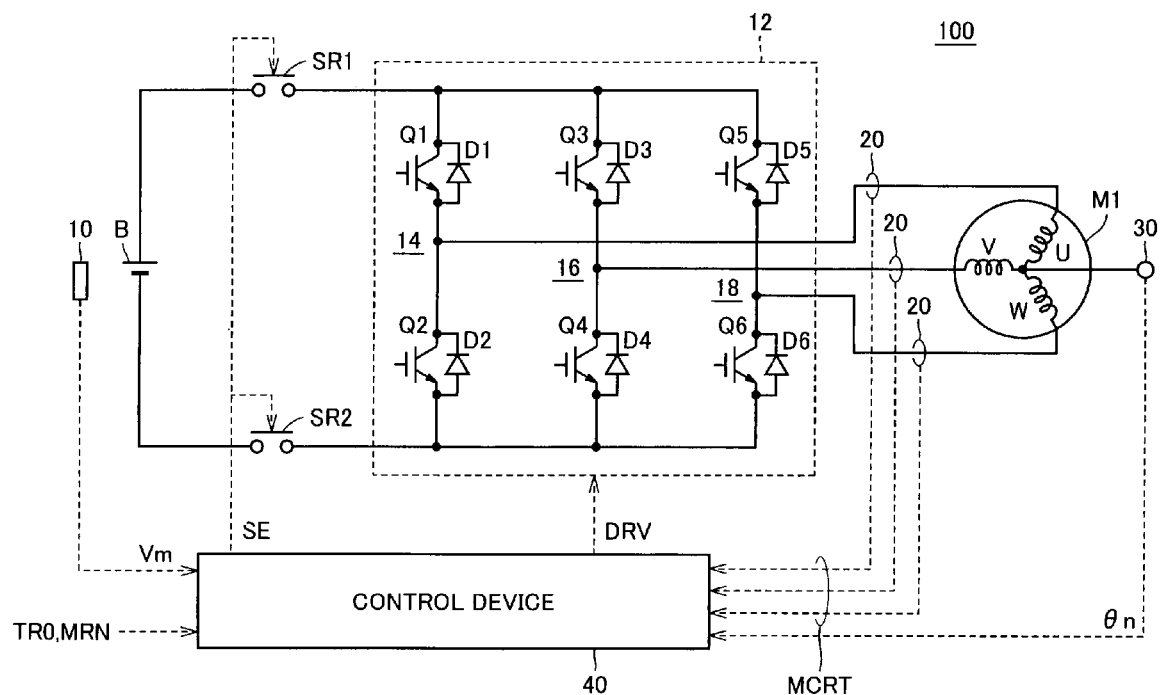
FIG. 1 is a schematic block diagram of a motor drive apparatus according to a first embodiment of the present invention.

Embodiments of the present invention are hereinafter described in detail with reference to the drawings. In the drawings, like components are denoted by like reference characters.

First Embodiment

FIG. 1 is a schematic block diagram of a motor drive apparatus according to a first embodiment of the present invention.

Referring to FIG. 1, motor drive apparatus 100 includes a DC power supply B, a voltage sensor 10, an inverter 12, an electric-current sensor (hereinafter current sensor) 20, a resolver 30, and a control device 40.

An AC motor M1 is a drive motor for generating torque to drive the drive wheels of a hybrid vehicle or electric vehicle. AC motor M1 also operates as an electric generator driven by an engine as well as an electric motor for the engine and thus have the ability to start the engine for example.

Inverter 12 is comprised of a U phase arm 14, a V phase arm 16 and a W phase arm 18. U phase arm 14, V phase arm 16 and W phase arm 18 are provided in parallel between a power supply line and a ground line.

U phase arm 14 is comprised of series-connected NPN transistors Q1, Q2. V phase arm 16 is comprised of series-connected NPN transistors Q3, Q4. W phase arm 18 is comprised of series-connected NPN transistors Q5, Q6. Between respective collectors and emitters of NPN transistors Q1–Q6, diodes D1–D6 flowing current from respective emitters to respective collectors are connected.

An intermediate point of each phase arm is connected to an end of each phase coil of AC motor M1. Specifically, AC motor M1 is a three-phase permanent-magnet motor configured of three coils of U, V and W phases respectively. One end of the U phase coil, one end of the V phase coil and one end of the W phase coil are connected at the common central junction, while the other end of the U phase coil is connected to an intermediate point between NPN transistors Q1 and Q2, the other end of the V phase coil is connected to an intermediate point between NPN transistors Q3 and Q4 and the other end of the W phase coil is connected to an intermediate point between NPN transistors Q5 and Q6.

DC power supply B is comprised of secondary or rechargeable cell(s), for example, of nickel hydride or lithium ion. Voltage sensor 10 detects voltage Vm which is output from DC power supply B to output the detected voltage Vm to control device 40.

System relays SR1, SR2 are turned on/off in response to signal SE from control device 40.

Receiving the DC voltage supplied from DC power supply B, inverter 12 converts the DC voltage into an AC voltage based on signal DRV from control device 40 to drive AC motor M1. Accordingly, AC motor M1 is driven to generate torque indicated by torque command value TR0.

In a regenerative braking mode of the hybrid vehicle or electric vehicle having motor drive apparatus 100 mounted thereon, inverter 12 converts an AC voltage generated by AC motor M1 into a DC voltage based on signal DRV from control device 40 to supply the resultant DC voltage to DC power supply B.

The regenerative braking here includes braking accompanied by regenerative power generation that is effected when a driver of the hybrid or electric vehicle steps on the foot brake as well as deceleration (or stop of acceleration) accompanied by regenerative power generation that is effected when the driver releases the accelerator pedal without operating the foot brake.

Current sensors 20 detect motor current MCRT flowing through AC motor M1 to output the detected motor current MCRT to control device 40.

Resolver 30 is attached to the axis of rotation of AC motor M1 to detect and output rotational angle θn of a rotor of AC motor M1.

Control device 40 receives torque command value TR0 and motor revolution number (number of revolutions of the motor) MRN that are input from an externally provided ECU (Electrical Control Unit), voltage Vm from voltage sensor 10, motor current MCRT from current sensors 20, and rotational angle θn from resolver 30.

Control device 40 uses rotational angle θn from resolver 30, torque command value TR0 and motor current MCRT to generate drive signal DRV for driving NPN transistors Q1–Q6 of inverter 12, and outputs the generated drive signal DRV to inverter 12.

Further, when the hybrid or electric vehicle having motor drive apparatus 100 mounted thereon is in the regenerative braking mode, control device 40 generates drive signal DRV for converting an AC voltage generated by AC motor M1 into a DC voltage based on rotational angle θn, torque command value TR0 and motor current MCRT, and outputs the generated drive signal DRV to inverter 12. In this case, NPN transistors Q1–Q6 of inverter 12 are switching-controlled by drive signal DRV. In this way, inverter 12 converts an AC voltage generated by AC motor M1 into a DC voltage and supplies the resultant DC voltage to DC power supply B.

Figure 2:
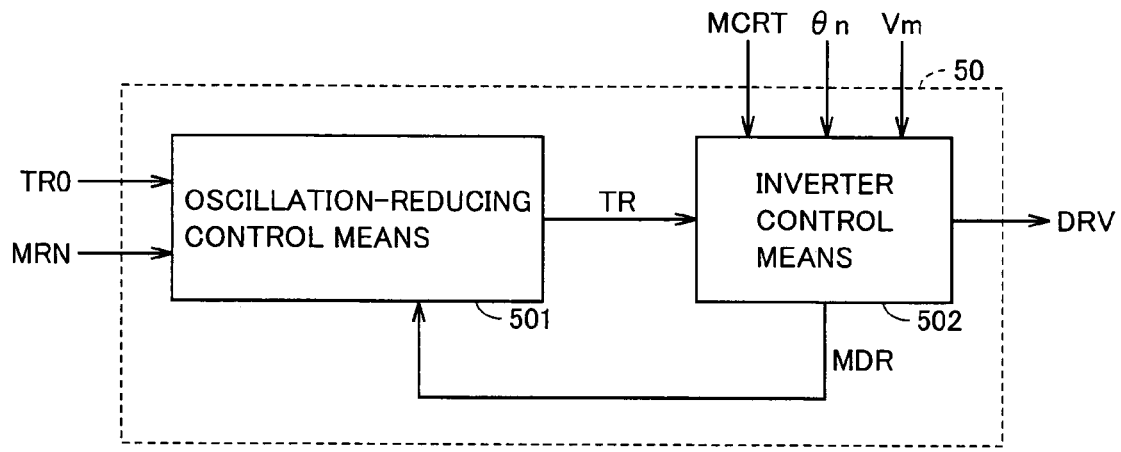
FIG. 2 is a block diagram of an inverter control circuit included in a control device in FIG. 1.

FIG. 2 is a block diagram of an inverter control circuit 50 included in control device 40 of FIG. 1.

Referring to FIG. 2, inverter control circuit 50 includes oscillation-reducing control means 501 and inverter control means 502.

Oscillation-reducing control means 501 employs anti-phase torque addition method for reducing oscillations occurring in the output torque of AC motor M1. Specifically, to torque command value TR0, torque (hereinafter also referred to as "oscillation-reducing torque") for canceling oscillations of the torque is added.

According to this method, from the detected number of revolutions or motor revolution number MRN, a varying component of the revolution number is extracted and, torque (oscillation-reducing torque) that is opposite in phase to the extracted varying component is determined. The obtained oscillation-reducing torque is added to externally-provided torque command value TR0 and the sum is output, as final torque command value TR, to inverter control means 502.

Since the above-described oscillation-reducing control requires high control response, the control is carried out in the PWM control mode among control modes of AC motor M1. As described hereinlater, oscillation-reducing control means 501 enters an operating state in response to designation of the PWM control mode by inverter control means and enters a non-operating state in response to designation of any control mode other than the PWM control mode. The control mode is identified based on signal MDR indicating a modulation factor that is output from inverter control means 502. The oscillation-reducing control is detailed hereinlater.

Based on rotational angle θn, final torque command value TR and motor current MCRT, inverter control means 502 generates drive signal DRV for turning on/off NPN transistors Q1–Q6 of inverter 12 when AC motor M1 is to be driven, and outputs the generated drive signal DRV to inverter 12.

Further, inverter control means 502 calculates the modulation factor from input voltage Vm of inverter 12 and a control amount of the voltage applied to each phase coil of AC motor M1. Inverter control means 502 sets a control mode of AC motor M1 based on the calculated modulation factor and outputs signal MDR indicating the modulation factor to oscillation-reducing control means 501.

Furthermore, inverter control means 502 generates drive signal DRV for converting an AC voltage generated by AC motor M1 into a DC voltage based on rotational angle θn, final torque command value TR and motor current MCRT in a regenerative braking mode of a hybrid vehicle or electric vehicle on which motor drive apparatus 100 is mounted, and outputs the signal to inverter 12.

Figure 3:
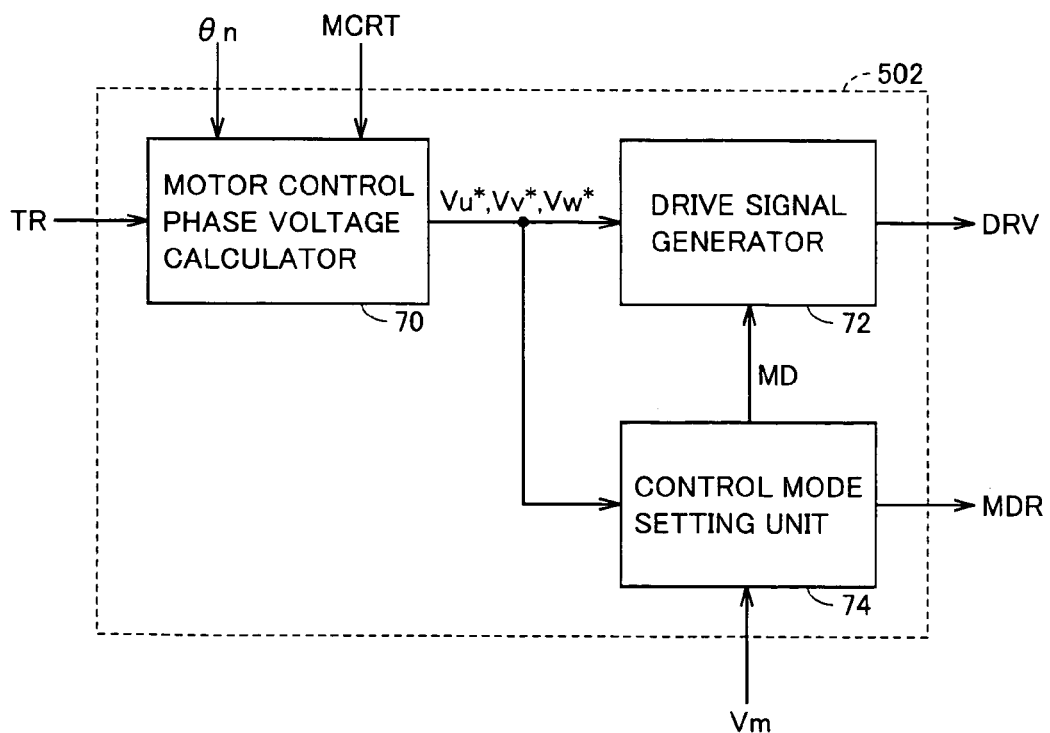
FIG. 3 is a control block diagram of inverter control means shown in FIG. 2.

FIG. 3 is a control block diagram of inverter control means 502 shown in FIG. 2.

Referring to FIG. 3, inverter control means 502 includes a motor control phase voltage calculator 70, a drive signal generator 72 and a control mode setting unit 74.

Motor control phase voltage calculator 70 receives motor current MCRT flowing through each phase of AC motor M1 from current sensor 20, and receives final torque command value TR from oscillation-reducing torque control means 501. Then, based on these input signals, motor control phase voltage calculator 70 outputs control amounts Vu*, Vv*, Vw* of the voltage to be applied to each phase coil of AC motor M1.

Figure 4:
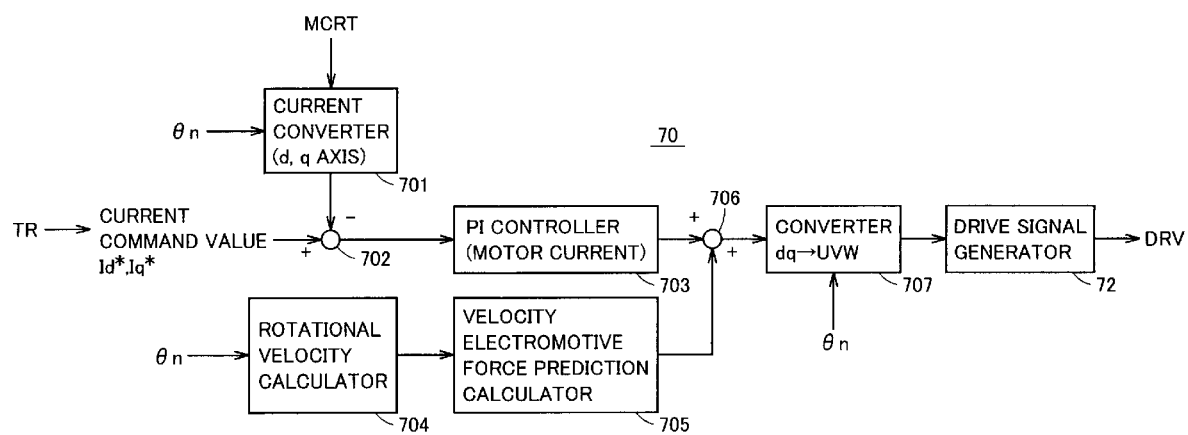
FIG. 4 is a control block diagram of a motor control phase voltage calculator shown in FIG. 3.

FIG. 4 is a control block diagram of motor control phase voltage calculator 70 shown in FIG. 3.

Referring to FIG. 4, motor control phase voltage calculator 70 includes a current converter 701, a subtractor 702, a PI controller, 703, a rotational velocity calculator 704, a velocity electromotive force prediction calculator 705, an adder 706, and a converter 707.

Current converter 701 performs three-to-two phase conversion on motor current MCRT detected by current sensor 20, using rotational angle θn output from resolver 30. Specifically, current converter 701 converts, using rotational angle θn, three-phase motor current MCRT flowing through each phase of AC motor M1 into values Id, Iq of current flowing in the direction of d and q axes respectively, and outputs the values to subtractor 702.

Subtractor 702 subtracts, from current command values Id*, Iq* calculated for allowing AC motor M1 to output the torque indicated by final torque command value TR, current values Id, Iq from current converter 701 to determine deviations ΔId, ΔIq.

PI controller 703 uses PI gain for deviations ΔId, ΔIq to calculate a control amount for adjusting the motor current.

Rotational velocity calculator 704 calculates the rotational velocity of AC motor M1 based on rotational angle θn received from resolver 30 and outputs the calculated rotational velocity to velocity electromotive force prediction calculator 705. Velocity electromotive force prediction calculator 705 calculates a prediction value of the velocity electromotive force based on the rotational velocity from rotational velocity calculator 704.

Adder 706 calculates the sum of the control amount for adjusting the motor curent provided from PI controller 703 and the prediction value of the velocity electromotive force from velocity electromotive force prediction calculator 705 to determine control amounts Vd, Vq of the voltage applied to the d and q axes.

Converter 707 converts control amounts Vd, Vq of the voltage applied to the d and q axes, using rotational angle θn, into control amounts Vu*, Vv*, Vw* of the voltage applied to the three-phase coil of AC motor M1.

Referring again to FIG. 3, control amounts Vu*, Vv*, Vw* of the voltage that are output from motor control phase voltage calculator 70 are input to drive signal generator 72 and control mode setting unit 74.

Control mode setting unit 74 receives voltage control amounts Vu*, Vv*, Vw* and input voltage Vm of inverter 12 to calculate a modulation factor that is a ratio therebetween. Then, control mode setting unit 74 sets, base on the calculated modulation factor, a control mode of AC motor M1 that is used by inverter 12, and outputs signal MD indicating the designated control mode to drive signal generator 72. Further, control mode setting unit 74 outputs signal MDR indicating the calculated modulation factor to oscillation-reducing control means 501 shown in FIG. 2.

Drive signal generator 72 generates, based on the control mode indicated by signal MD, drive signal DRV from voltage control amounts Vu*, Vv*, Vw*. Specifically, drive signal generator 72 generates, based on the input voltage control amounts Vu*, Vv*, Vw*, drive signal DRV for actually turning on/off NPN transistors Q1–Q6 of inverter 12 and outputs the generated drive signal DRV to transistors Q1–Q6 each.

Accordingly, each of NPN transistors Q1–Q6 are switching-controlled to control current to be flown through each phase of AC motor M1 so that AC motor M1 outputs torque as instructed. Thus, motor drive current MCRT is controlled and motor torque is output according to final torque command value TR.

The control mode of AC motor M1 that is used by inverter 12 includes PWM control mode, overmodulation control mode and rectangular-wave control mode. These control modes are different in frequency for turning on/off NPN transistors Q1–Q6 included in inverter 12 (the frequency is referred to as "carrier frequency"). Specifically, the PWM control mode is the highest, the overmodulation control mode is the second highest and the rectangular-wave control mode is the lowest in terms of carrier frequency.

Regarding the modulation factor indicating the ratio of control amounts Vu*, Vv*, Vw* of the voltage to input voltage Vm of inverter 12, the PWM control mode is the lowest, the overmodulation control mode is the second lowest and the rectangular-wave control mode is the highest. In other words, the PWM control mode is the lowest, the overmodulation control mode is the second lowest and the rectangular-wave control mode is the highest in voltage utilization factor.

Figure 5:
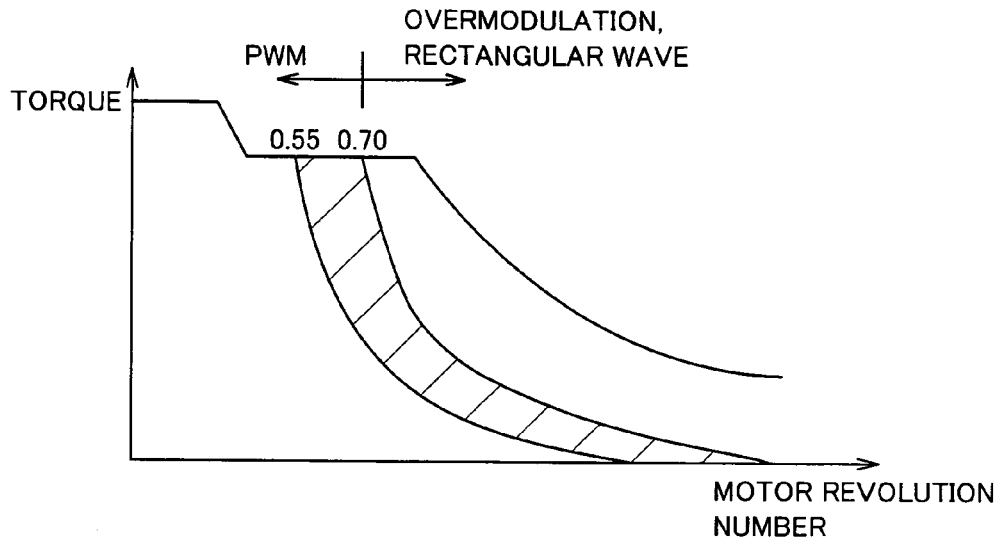
FIG. 5 shows a relation between torque of an AC motor M1 and motor revolution number MRN.

FIG. 5 shows a relation between the torque of AC motor M1 and motor revolution number MRN.

The torque of AC motor M1 is substantially constant before the motor revolution number reaches a predetermined revolution number and, when the motor revolution number exceeds the predetermined revolution number, the torque gradually decreases as motor revolution number MRN increases. The relation between the torque and motor revolution number MRN is different depending on the magnitude of the modulation factor. As the modulation factor is larger, namely as the voltage utilization factor is larger, greater torque is generated.

In FIG. 5, the region where the modulation factor is smaller than 0.7 represents that the control mode of AC motor M1 is the PWM control mode. The region where the modulation factor is 0.7 or more represents that that the control mode is the overmodulation control mode and rectangular-wave control mode.

As shown in FIG. 3, receiving voltage control amounts Vu*, Vv*, Vw*, control mode setting unit 74 calculates modulation factor MDR that is the ratio between the control amounts and input voltage Vm of inverter 12 and, according to the calculated modulation factor MDR, control mode setting unit 74 selects the optimum control mode from the correlation chart of FIG. 5. Control mode setting unit 74 outputs, to drive signal generator 72, signal MD that indicates the selected control mode.

Further, control mode setting unit 74 outputs signal MDR indicating the calculated modulation factor MDR to oscillation-reducing control means 501 in FIG. 2. Receiving signal MDR, oscillation-reducing control means 501 corrects the magnitude of the oscillation-reducing torque to be added to torque command value TR0, based on the calculated modulations factor MDR, which is discussed hereinlater.

Figure 6:
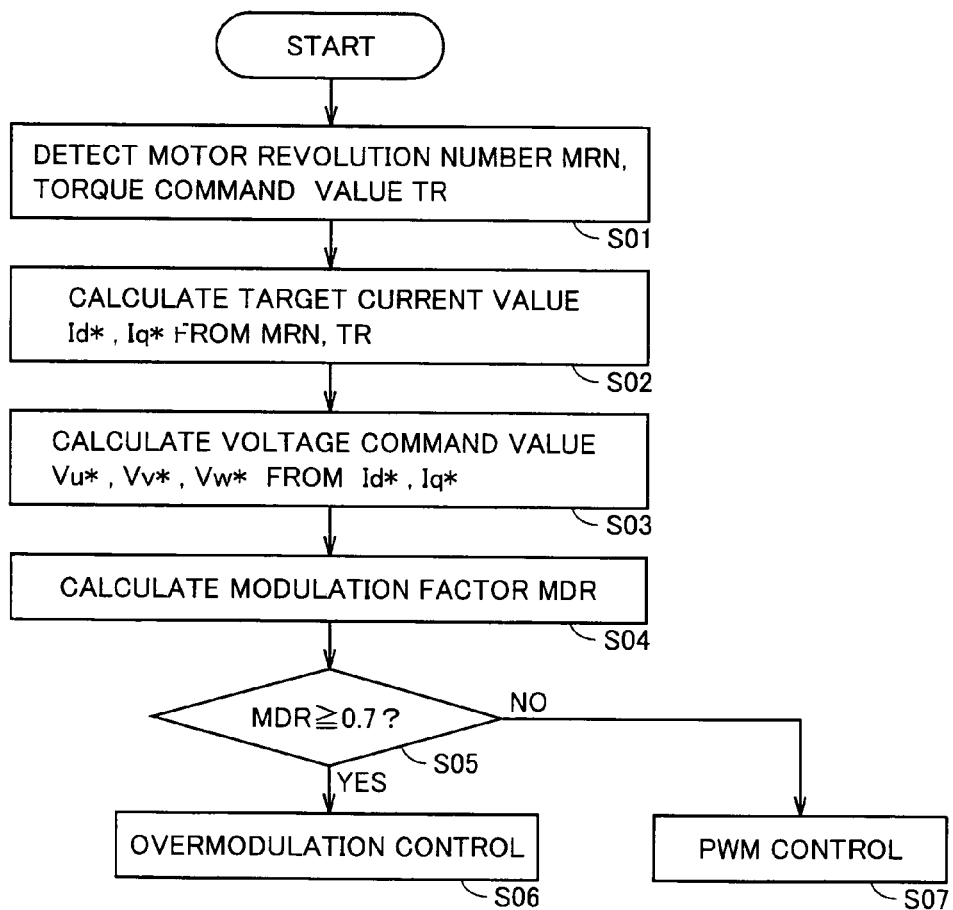
FIG. 6 is a flowchart illustrating an operation of setting a control mode of AC motor M1 performed by an inverter.

FIG. 6 is a flowchart for illustrating the operation of setting a control mode of AC motor M1 by inverter control means 502.

Referring to FIG. 6, motor control phase voltage calculator 70 of inverter control means 502 detects motor revolution number MRN and final torque command value TR (step S01) and, based on the two values detected, calculates current command values id*, iq* (step S02).

Motor control phase voltage calculator 70 performs the operation shown in FIG. 4 to determine, from current command values id*, iq*, voltage control amounts Vu*, Vv*, Vw* to be added to respective phases of AC motor M1 (step S03).

Control mode setting unit 74 calculates modulation factor MDR from voltage control amounts Vu*, Vv*, Vw* as well as input voltage Vm of inverter 12 (step S04), and selects the optimum control mode of AC motor M1 based on the magnitude of the calculated modulation factor MDR. Specifically, control mode setting unit 74 determines whether or not modulation factor MDR is 0.7 or larger (step S05).

In step S04, when modulation factor MDR is 0.7 or larger, the overmodulation control mode or the rectangular-wave control mode is selected (step S06). In contrast, when modulation factor MDR is smaller than 0.7, the PWM control mode is selected (step S07).

The selected control mode is provided as signal MD to drive signal generator 72 of inverter control means 502. Drive signal generator 72 generates drive signal DRV according to the control mode indicated by signal MD and outputs the signal to each phase of inverter 12.

As described above, inverter 12 changes the control mode of AC motor M1 according to modulation factor MDR. Accordingly, a high voltage utilization factor can be achieved and AC motor M1 can be controlled stably even in a state of transitional change in which the torque command value or motor revolution number suddenly changes.

Moreover, in the PWM control mode, the oscillation-reducing control is carried out as discussed below to reduce oscillations of the output torque. In this way, comfortable ride is achieved.

Figure 7:
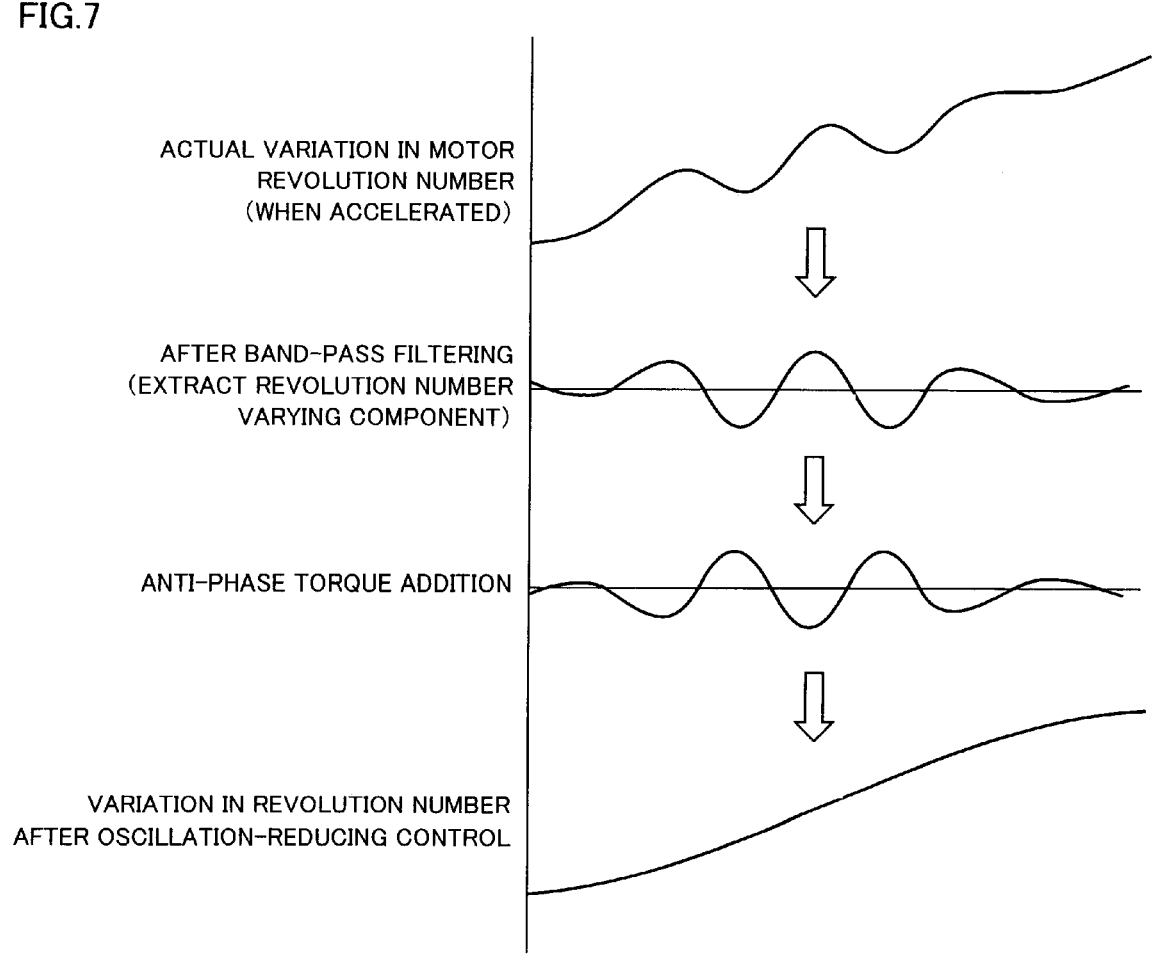
FIG. 7 is a schematic for illustrating an oscillation-reducing operation by oscillation-reducing control means shown in FIG. 2.

FIG. 7 is a schematic for illustrating the oscillation-reducing control performed by oscillation-reducing control means 501 shown in FIG. 2.

Referring to FIG. 7, while a vehicle is accelerating, the actual increase in motor revolution number MRN is not monotonous but undulating. The undulating component causes vibrations of the vehicle to make the driver feel uncomfortable.

Accordingly, in the present embodiment, oscillation-reducing control means 501 operates to eliminate this undulating component from motor revolution number MRN to allow motor revolution number MRN to monotonously increase that is an ideal increase.

Specifically, oscillation-reducing control means 501 extracts, from motor revolution number MRN, the undulating component (hereinafter also referred to as revolution number varying component $\Delta$MRN) of motor revolution number MRN and inverts the extracted revolution number varying component $\Delta$MRN to determine an anti-phase component of revolution number varying component $\Delta$MRN. Then, oscillation-reducing control means 501 converts the anti-phase component into torque to generate oscillation-reducing torque $\Delta$tr. Further, oscillation-reducing control means 501 adds this oscillation-reducing torque $\Delta$tr to torque command value TR0 provided from an external component to provide the resultant sum as final torque command value TR. As discussed above, inverter control means 502 drives AC motor M1 so that the output torque is provided according to final torque command value TR.

Thus, revolution number varying component $\Delta$MPN and the anti-phase component cancel each other and consequently, the waveform shown at the bottom in FIG. 7 can be obtained that monotonously increases without undulation. A specific configuration for performing this oscillation-reducing control is described below.

Figure 8:
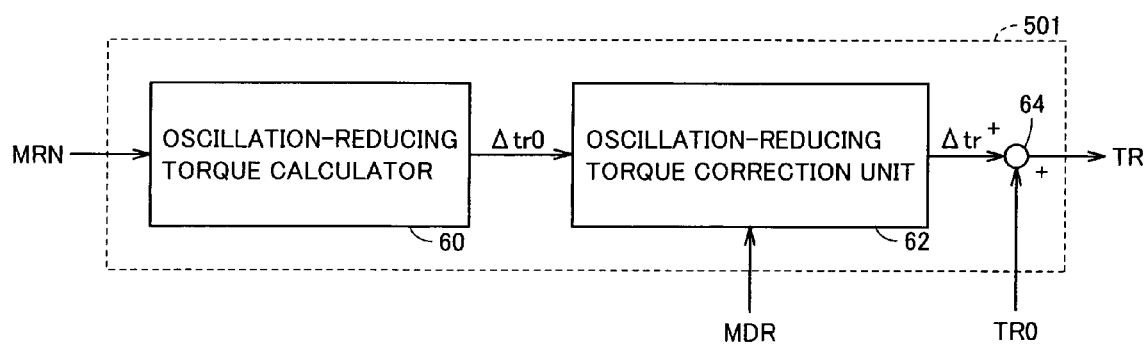
FIG. 8 is a block diagram of the oscillation-reducing control means for performing the oscillation-reducing control in FIG. 7.

FIG. 8 is a block diagram of oscillation-reducing control means 501 for performing the oscillation-reducing control as shown in FIG. 7.

Referring to FIG. 8, oscillation-reducing control means 501 includes an oscillation-reducing torque calculator 60, an oscillation-reducing torque correction unit 62 and an adder 64.

Oscillation-reducing torque calculator 60 extracts, from detected motor revolution number MRN, revolution number varying component $\Delta$MRN and generates oscillation-reducing torque $\Delta$tr0 for canceling the extracted revolution number varying component $\Delta$MRN.

Figure 9:
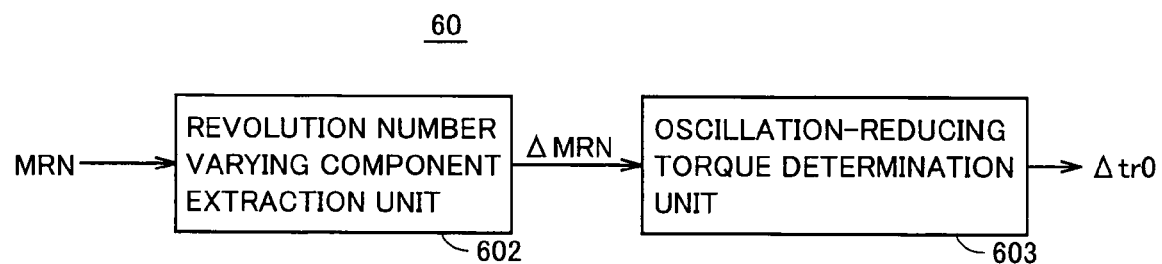
FIG. 9 is a control block diagram of an oscillation-reducing torque calculator in FIG. 8.

FIG. 9 is a block diagram showing a configuration of oscillation-reducing torque calculator 60.

Referring to FIG. 9, a revolution number varying component extraction unit 602 is constituted of a bandpass filter to extract, from motor revolution number MRN, motor revolution number varying component $\Delta$MRN of a specific frequency.

An oscillation-reducing torque determination unit 603 inverts revolution number varying component $\Delta$MRN to determine an anti-phase component and multiplies the anti-phase component by a predetermined coefficient kp for conversion into torque. The torque obtained by the conversion is provided as oscillation-reducing torque $\Delta$tr0 to oscillation-reducing torque correction unit 62 in FIG. 8.

Oscillation-reducing torque correction unit 62 makes a correction as discussed below to oscillation-reducing torque $\Delta$tr0 that is input. The corrected oscillation-reducing torque $\Delta$tr is added to torque command value TR0 by adder 64 to determine final torque command value TR. This final torque command value TR is provided to inverter control means 502.

The oscillation-reducing control is effective only in the PWM control mode that is high in control response, as described above. Therefore, the oscillation-reducing control is difficult to implement in the overmodulation control mode and rectangular-wave control mode that are relatively low in control response. In other words, in the overmodulation control mode and rectangular-wave control mode, oscillation-reducing torque $\Delta$tr0 cannot be generated ($\Delta$tr0=0).

Therefore, at the time of switching of the control mode of AC motor M1 from the PWM control mode to the overmodulation control mode, the output torque of AC motor M1 varies by the magnitude corresponding to the oscillation-reducing torque. The variation is a discontinuous portion, namely a so-called stepped portion of the output torque to cause the vehicle to vibrate.

In order to eliminate the stepped portion, it is necessary that the output torque attenuates smoothly in a transition stage in which the control mode is switched from the PWM control mode to the overmodulation control mode.

Accordingly, in the present embodiment, in the transition stage in which the control mode is switched from the PWM control mode to the overmodulation control mode, a correction is made to allow oscillation-reducing torque $\Delta$tr0 to smoothly change to zero. Specifically, oscillation-reducing torque correction unit 62 shown in FIG. 8 makes a correction to allow oscillation-reducing torque $\Delta$tr0 to gradually decrease as the control mode is switched.

The switching timing of the control mode in the present embodiment is detected from a change in modulation factor MDR. The control mode changes from the PWM control mode to the overmodulation control mode when modulation factor MDR exceeds 0.7 as shown in FIG. 5. Therefore, oscillation-reducing torque correction unit 62 may detect modulation factor MDR to know when the control mode is switched.

Specifically, oscillation-reducing torque correction unit 62 makes a correction to cause oscillation torque Δtr0 to gradually decrease as modulation factor MDR increases to approach 0.7 and finally become zero when modulation factor MDR reaches 0.7. In order to implement such a correction, oscillation-reducing torque correction unit 62 has correction coefficient Km that varies according to modulation factor MDR and multiplies oscillation-reducing torque Δtr0 by this correction coefficient Km to calculate final oscillation-reducing torque Δtr.

Figure 10:
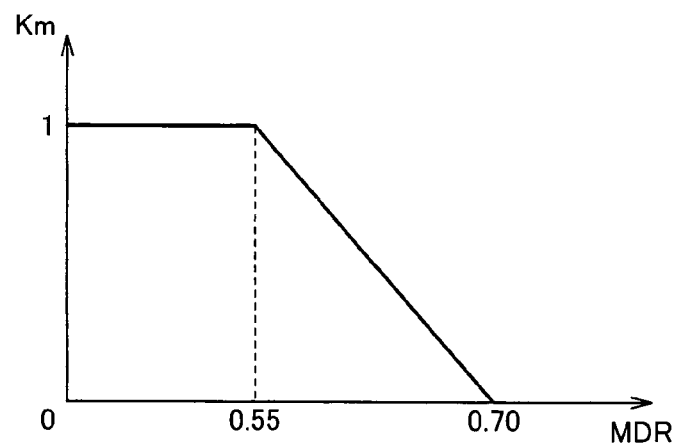
FIG. 10 shows a relation between correction coefficient Km and modulation factor MDR.

FIG. 10 shows a relation between correction coefficient Km and modulation factor MDR.

Referring to FIG. 10, correction coefficient Km is one in the region where modulation factor MDR is smaller than 0.55 and is zero in the region where modulation factor MDR is 0.7 or more. Further, correction coefficient Km gradually decreases from one to zero as modulation factor MDR increases in the region where modulation factor MDR is between 0.55 and 0.70. In the present embodiment, correction coefficient Km starts to gradually decrease when modulation factor MDR is 0.55 for satisfying the condition that the oscillation-reducing torque gradually decreases while no adverse influence is exerted on the oscillation-reducing control in the PWM control mode. As long as this condition is satisfied, modulation factor MDR at which oscillation-reducing torque Δtr starts to gradually decrease may be set to an arbitrary value.

Oscillation-reducing torque correction unit 62 multiplies oscillation-reducing torque Δtr0 by correction coefficient Km according to the magnitude of modulation factor MDR to calculate final oscillation-reducing torque Δtr. Thus, as modulation factor MDR approaches 0.7, oscillation-reducing torque Δtr gradually decreases to zero.

Figure 11:
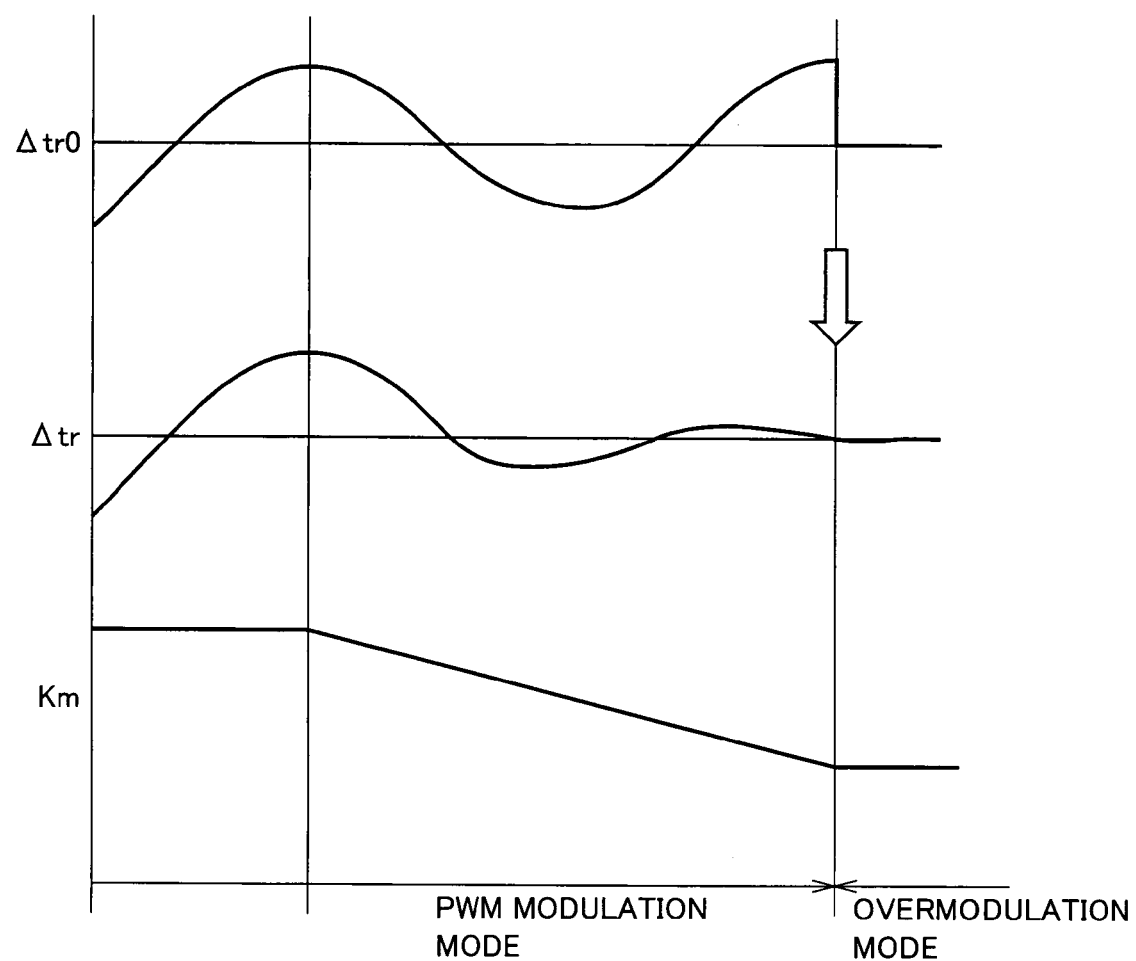
FIG. 11 is a waveform chart of oscillation-reducing torque Δtr after an oscillation-reducing torque correction.

FIG. 11 is a waveform chart of oscillation-reducing torque Δtr after the oscillation-reducing torque correction.

Referring to FIG. 11, it is seen that oscillation-reducing torque Δtr that is determined by multiplying oscillation-reducing torque Δtr0 by correction coefficient Km shows a gradual decrease as correction coefficient Km decreases and, when the control mode is switched, oscillation-reducing torque Δtr becomes approximately zero. In this way, the stepped portion of oscillation-reducing torque Δtr0 is eliminated and the corrected torque is continuous in the transition stage in which the control mode is switched.

As a result, the output toque of AC motor M1 is continuous in the transition stage in which the control mode is switched from the PWM control mode to the overmodulation control mode and thus vibrations of the vehicle can be reduced.

Oscillation-reducing torque correction unit 62 stores, as a map, the chart shown in FIG. 10 that shows correlation between correction coefficient Km and modulation factor MDR. Receiving signal MDR indicating the modulation factor from control mode setting unit 74 of inverter control means 502, oscillation-reducing torque correction unit 62 selects a correction coefficient Km corresponding to this modulation factor MDR and multiplies oscillation-reducing torque Δtr0 by the selected correction coefficient Km. Then, oscillation-reducing torque correction unit 62 outputs the result of the multiplication as final oscillation-reducing torque Δtr to adder 64.

Figure 12:
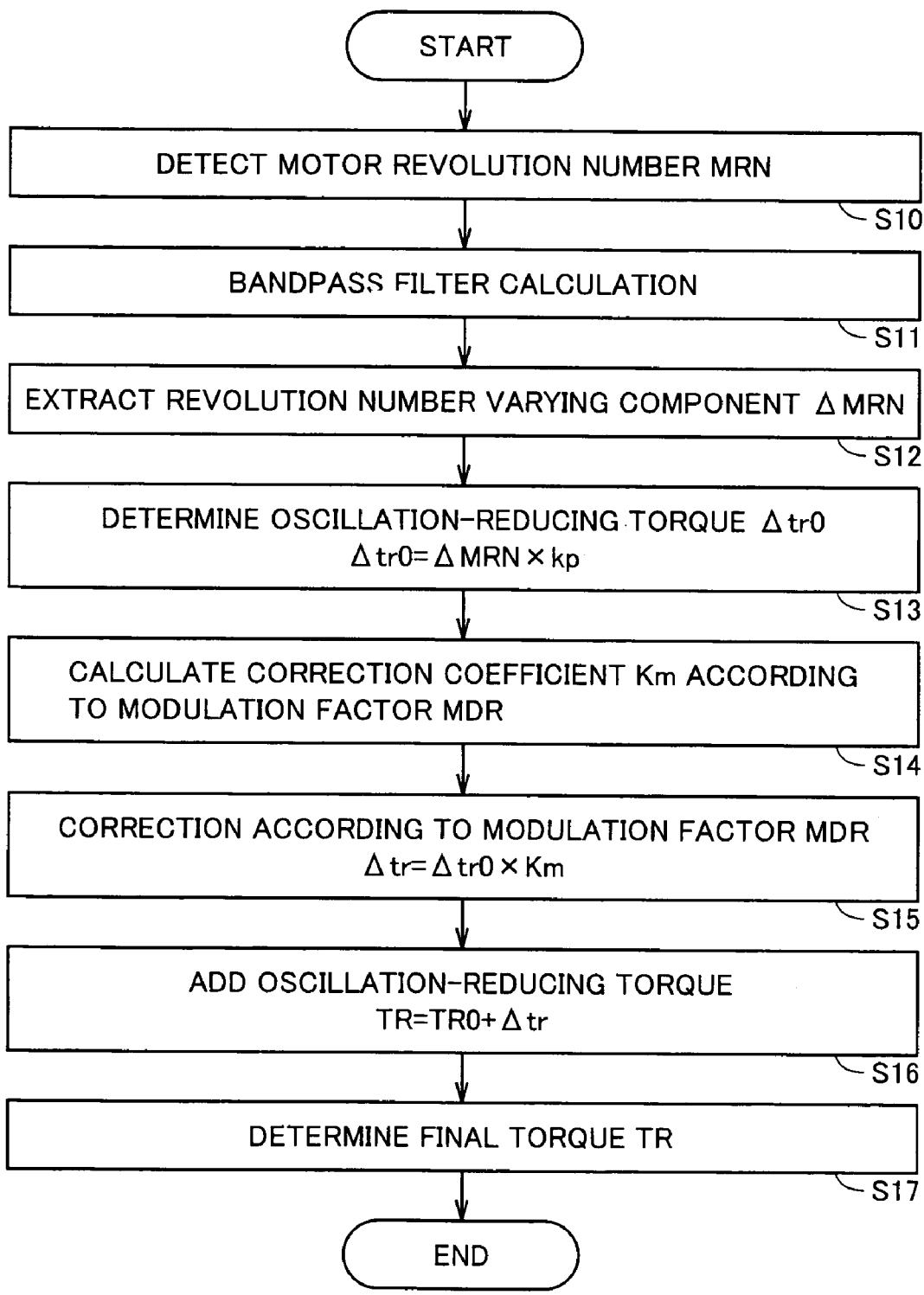
FIG. 12 is a flowchart illustrating the oscillation-reducing control operation of the motor drive apparatus according to the first embodiment of the present invention.

FIG. 12 is a flowchart illustrating the oscillation-reducing control of motor drive apparatus 100 in the first embodiment of the present invention.

Referring to FIG. 12, oscillation-reducing torque calculator 60 detects motor revolution number MRN (step S10). Revolution number varying component extraction unit 602 performs a calculation by a bandpass filter (step S11) and extracts revolution number varying component ΔMRN from the detected motor revolution number MRN (step S12).

Then, oscillation-reducing torque determination unit 603 determines an anti-phase component of revolution number varying component ΔMRN and multiplies the anti-phase component by a predetermined coefficient kp to convert the component into torque. Oscillation-reducing torque determination unit 603 determines the resultant torque as oscillation-reducing torque Δtr0 (step S13).

Further, oscillation-reducing torque correction unit 62 makes a correction to the determined oscillation-reducing torque Δtr0 according to switching of the control mode of AC motor M1.

Specifically, oscillation-reducing torque correction unit 62 selects, from the map shown in FIG. 10, correction coefficient Km corresponding to modulation factor MDR indicated by signal MDR from oscillation-reducing mode setting unit 74 (step S14).

Then, oscillation-reducing torque Δtr0 is multiplied by the selected correction coefficient Km and the product is determined as a final oscillation-reducing torque Δtr (step S15). The final oscillation-reducing torque Δtr is added to torque command value TR0 from an external component and the sum is determined as final torque command value TR (steps S16 and S17).

The determined final torque command value TR is output from oscillation-reducing control means 501 to be provided to motor control phase voltage calculator 70 of inverter control means 502. Based on the final torque command value TR, motor revolution current MCRT and input voltage Vm of inverter 12, motor control phase voltage calculator 70 determines voltage control amounts Vu*, Vv*, Vw* to be applied to the three-phase coil of AC motor M1. From voltage control amounts Vu*, Vv*, Vw*, control mode setting unit 74 determines modulation factor MDR to output to drive signal generator 72 signal MD indicating a control mode according to the modulation factor. Based on the control mode indicated by signal MD, drive signal generator 72 generates drive signal DRV from voltage control amounts Vu*, Vv*, Vw* output from motor control phase voltage calculator 70.

As discussed above, according to the first embodiment of the present invention, with the configuration where the control mode of the AC motor is switched according to the modulation factor, the oscillation-reducing torque that is generated in the PWM control mode is corrected according to a correction coefficient that varies with the modulation factor. Thus, when the control mode is switched from the PWM control mode to the overmodulation control mode, the oscillation-reducing torque decreases gradually so that occurrence of the stepped portion of the output torque can be prevented.

Second Embodiment

As described above in connection with the first embodiment, oscillation-reducing control means 501 of the present invention generates oscillation-reducing torque Δtr based on an anti-phase component of revolution number varying component ΔMRN of motor revolution number MRN. Inverter control means 502 adds the generated oscillation-reducing torque Δtr to externally provided torque command value TR0 and the sum is used as final torque command value TR for driving AC motor M1. Thus, oscillations of the output torque of AC motor M1 can be reduced and ride comport can be implemented. In particular, the oscillation-reducing control is effective in such a case where there is any trigger causing vibrations of the vehicle, for example, where torque command value TR0 of AC motor M1 suddenly changes.

However, when the vehicle is in a normal-running state or stopped and load-free state, any subtle change in output torque results in any behavior of the vehicle and thus the oscillation-reducing torque generated by oscillation-reducing control means 501 could adversely influence the behavior of the vehicle. In other words, if the oscillation-reducing control is always applied in the same manner even when the amount of variation in output torque is small, there arises an adverse effect.

Thus, in second to sixth embodiments of the present invention that are described below, a method is proposed to apply the oscillation-reducing control that is performed more effectively so that the maximum advantages are derived therefrom. In the following embodiments, it is supposed that the motor drive apparatus of the present invention is mounted on a hybrid vehicle and, a description is given below of a method of applying the oscillation-reducing control.

In the hybrid vehicle, an engine ENG and two motor generators (MG1, MG2) are connected to each other through a known planetary gear.

Motor generator MG1 is connected to engine ENG. Motor generator MG1 serves as an electric generator generating an AC voltage from the rotational power from engine ENG and also serves as an electric motor starting the engine. Motor generator MG2 is a drive motor for generating torque (hereinafter also referred to as drive torque) for driving drive wheels of the hybrid vehicle.

The motor drive apparatus in the following embodiments includes a DC power supply, two inverters for driving motor generators MG1, MG2 respectively and a control device.

As inverter 12 shown in FIG. 1, the two inverters are each comprised of a U-phase arm, a V-phase arm and a W-phase arm. Two inverters convert a DC voltage into an AC voltage based on drive signal DRV from the control device to drive respective motor generators MG1, MG2.

The control device includes two inverter control circuits for controlling the two inverters respectively. The inverter control circuits each include inverter control means. As inverter control means 502 shown in FIG. 2, the inverter control means receives torque command value TR1 (or TR2) and motor revolution number MRN1 (or MRN2) of motor generator MG1 (or MG2), receives input voltage Vm from a voltage sensor, motor current MCRT1 (or MCRT2) from a current sensor, and receives rotational angle θn1 (or θn2) from a resolver and generates, based on them, drive signal DRV1 (or DRV2) for driving NPN transistors of a relevant inverter. The inverter control circuits each output the generated drive signal DRV1 (or DRV2) to a relevant inverter.

In particular, the inverter control circuit controlling the inverter that drives motor generator MG2 that is a drive motor is identical in configuration to inverter control circuit 50 shown in FIG. 2 and includes, in addition to inverter control means 502, oscillation-reducing control means 501 for reducing oscillations of the output torque of motor generator MG2.

Figure 13A:
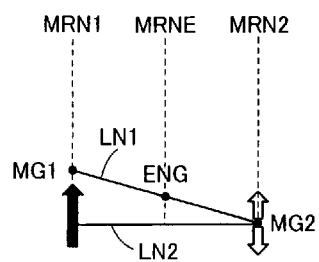
FIGS. 13A–13C are nomograms for respective states of a hybrid vehicle.
Figure 13B:
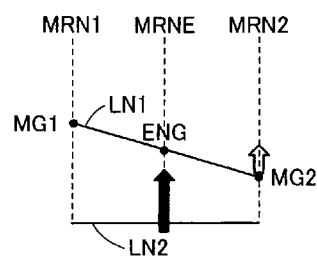
Figure 13C:
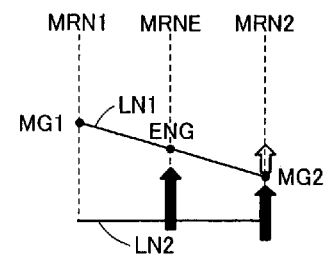

FIGS. 13A to 13C are nomograms showing respective states of the hybrid vehicle. The vehicle's states are each described below.

FIG. 13A is a nomogram representing the state of cranking. Referring to FIG. 13A, motor revolution number MRN1 of motor generator MG1, motor revolution number MRN2 of motor generator MG2 and engine revolution number MRNE of engine ENG are on straight line LN1 when motor revolution numbers MRN1, MRN2 are arranged with engine revolution number MRNE therebetween. In other words, motor revolution numbers MRN1, MRN2 and engine revolution number MRNE always change to be located on the straight line.

It is supposed that the region over straight line LN2 represents a region where motor generators MG1, MG2 are driven in powering or electric-motor mode and the region under straight line LN2 represents a region where motor generators MG1, MG2 are driven in regenerative or electric-generator mode. Then, as engine ENG is started, motor generator MG1 is driven in the powering mode so that motor revolution number MRN1 is shifted upward to a large degree from straight line LN2 as shown in FIG. 13A.

At this time, depending on drive conditions, in response to an instruction to start engine ENG, motor generator MG2 may be driven in the regenerative mode to start engine ENG in some cases. If motor generator MG2 is driven in the powering mode to start engine when an instruction to start engine ENG is given, motor revolution number MRN2 is shifted upward relative to straight line LN2.

Thus, as motor revolution number MRN1 suddenly increases and accordingly torque (torque command value TR1) required for driving motor generator MG1 suddenly increases, the drive torque of motor generator MG2 also suddenly changes. At this time, if an amount of variation in drive torque is large, the revolution number varying component of motor revolution number MRN2 increases to cause the vehicle to vibrate.

An example of the case, except for cranking, where torque command value TR1 of motor generator MG1 suddenly changes is the case where the vehicle having been in a normal-running state is accelerated. In this case, the motor drive apparatus increases engine revolution number MRNE, operates motor generator MG1 in the regenerative mode and accelerates the vehicle by adding drive force of motor generator MG2 driven by the generated electric power. At this time, motor revolution number MRN1 is shifted downward to a large degree while motor revolution number MG2 is shifted upward in FIG. 13A.

FIG. 13B is a nomogram representing the state where the engine is started. Upon cranking by motor generator MG1, engine ENG is started under control of ignition and injection. As engine ENG starts, engine revolution number MRNE is shifted upward to a large degree relative to straight line LN2 as shown in FIG. 13B. As engine revolution number MRNE suddenly increases, the engine torque required for engine ENG also suddenly increases.

As engine revolution number MRNE further increases, straight line LN1 as a whole is shifted upward relative to straight line LN2 and thus motor revolution number MRN2 is shifted upward.

With engine ENG under control, fuel supply to engine ENG is stopped (fuel cut) in an idling state while running. As the fuel supply is stopped, engine revolution number MRNE suddenly decreases. As a result, straight line LN1 is shifted downward and motor revolution number MRN2 of motor generator MG2 is also shifted downward.

Thus, when a sudden change occurs in engine torque (torque command value TE) required for engine ENG, motor revolution number MRN2 changes and an amount of variation in drive torque of motor generator MG2 increases.

FIG. 13C is a nomogram representing the state of acceleration. As the vehicle having been in a normal-running state is accelerated, the motor drive apparatus increases engine revolution number MRNE and drives motor generator MG2 in the powering mode by electric power generated by motor generator MG1. Therefore, as torque command value TR2 of motor generator MG2 suddenly increases, motor revolution number MRN2 is shifted upward.

In the regenerative braking mode (not shown), the motor drive apparatus drives motor generator MG2 in the regenerative mode to supply the generated electric power to the DC power supply. At this time, as torque command value TR2 suddenly changes, motor revolution number MRN2 of motor generator MG2 is shifted downward.

The regenerative braking here includes braking accompanied by regenerative power generation that is effected when a driver of the hybrid vehicle steps on the foot brake as well as deceleration (or stop of acceleration) accompanied by regenerative power generation that is effected when the driver releases the accelerator pedal without operating the foot brake.

Further, torque command value TR2 of motor generator MG2 suddenly changes, except for the cases where the vehicle is operated in the acceleration or regenerative braking mode as discussed above, under running control such as TRC (Traction Control System) and vehicle dynamics management (VDM) system for example.

As seen from the above, in respective states of the vehicle corresponding to nomograms of FIGS. 13A–13C, torque command values TR1, TR2 or TE relevant to one of motor generators MG1, MG2 and engine ENG suddenly changes so that there arises a sudden change in drive torque that is output from motor generator MG2. The sudden change in drive torque causes undulation of motor revolution number MRN2.

Then, in the present embodiment, the motor drive apparatus executes the oscillation-reducing control when an amount of variation in drive torque of motor generator MG2 is large. Specifically, the motor drive apparatus is configured to perform the oscillation-reducing control under at least one of the condition that variation amount $\Delta TR1$ of torque command value TR1 of motor generator MG1 exceeds a predetermined threshold, the condition that variation amount $\Delta TR2$ of torque command value TR2 of motor generator MG2 exceeds a predetermined threshold and the condition that variation amount $\Delta TE$ of torque command value TE of engine ENG exceeds a predetermined threshold. Here, the predetermined thresholds for respective variation amounts $\Delta TR1$, $\Delta TR2$, $\Delta TE$ correspond to variation amounts $\Delta TR1$, $\Delta TR2$, $\Delta TE$ of the torque command values that can be detected as a varying component of the motor revolution number when a CPU constituting the control device performs the PWM control in predetermined control cycles.

The motor drive apparatus determines that, when all of variation amounts $\Delta TR1$, $\Delta TR2$, $\Delta TE$ of torque command values are smaller than respective relevant predetermined thresholds, the amount of variation in drive torque of motor generator MG2 is small, and inhibits the oscillation-reducing control. Thus, it can be prevented that the oscillation-reducing control undesirably deteriorates the vehicle's behavior. For example, when the vehicle is in the normal running state or stopped and load-free state, for example, oscillation-reducing control means 502 operates to inhibit the oscillation-reducing control. Specifically, the oscillation-reducing control may be inhibited by setting correction coefficient Km by which oscillation-reducing torque $\Delta tr0$ is multiplied by oscillation-reducing torque correction unit 62 of oscillation-reducing control means 501 to zero or the addition by adder 64 may be inhibited.

As discussed above, according to the second embodiment of the present invention, the oscillation-reducing control is executed or stopped depending on the magnitude of the variation amount of the drive torque that is output from the drive motor. Thus, the oscillation-reducing control can effectively be exercised to enhance effects of the oscillation-reducing control.

Third Embodiment

In the second embodiment described above, the description is given of the method of applying the oscillation-reducing control in the case where an amount of variation in drive torque exerted on the drive wheels is large.

As described in connection with FIGS. 13A–13C, the amount of variation in drive torque that is output from motor generator MG2 changes in magnitude depending on the state of the vehicle.

Accordingly, when the oscillation-reducing control is carried out, the magnitude of the oscillation-reducing torque may be changed depending on the variation amount of the drive torque so as to enhance the effects of the oscillation-reducing control.

Specifically, when the variation amount of the drive torque is relatively large, oscillation-reducing torque correction unit 62 of oscillation-reducing control means 501 makes a correction by multiplying oscillation-reducing torque $\Delta tr0$ by a relatively large correction coefficient Km. For example, when the engine is started, in order that engine revolution number MRNE may pass the point of resonance of engine ENG in a short period of time, large torque is applied to motor generator MG1. In other words, in the nomogram of FIG. 13A, motor revolution number MRN1 is shifted upward to a large degree. Accordingly, a large force that causes motor revolution number MRN2 to be shifted downward is exerted on motor generator MG2 and the amount of variation in drive torque sharply increases. In such a case, oscillation-reducing torque correction unit 62 makes a correction by multiplying oscillation-reducing torque $\Delta tr0$ by relatively large correction coefficient Km and, based on the corrected oscillation-reducing torque $\Delta tr$, generates final torque command value TR.

In contrast, when the drive torque is varied in response to ON/OFF of the accelerator, a relatively small force is exerted on motor generator MG2 as compared with the one in the engine starting state. In this case, oscillation-reducing torque correction unit 62 makes a correction by multiplying oscillation-reducing torque $\Delta tr0$ by relatively small correction coefficient Km.

Correction coefficient Km is set in a stepwise manner by oscillation-reducing torque correction unit 62 according to variations of the force that occurs in each vehicle. Specifically, depending on the magnitude of the force, a plurality of correction coefficients Km are set so that the correction coefficient increases stepwise. Alternatively, correction coefficient Km is set so that the correction coefficient continuously increases as variation amounts $\Delta TR1$, $\Delta TR2$, $\Delta TE$ of torque command values as illustrated in the second embodiment increase.

According to the third embodiment, oscillation-reducing torque $\Delta tr$ is generated based on correction coefficient Km that varies according to the magnitude of the force exerted on motor generator MG2. Thus, as compared with the case where the oscillation-reducing torque is generated based on the correction coefficient that is fixed at a constant value, vibrations of the vehicle can more efficiently be reduced.

Fourth Embodiment

The effects of the oscillation-reducing control may be enhanced, as described below, by performing, at an early stage of occurrence of variation in motor revolution number MRN2 of motor generator MG2, the oscillation-reducing control to reduce the variation in revolution number.

Figure 14:
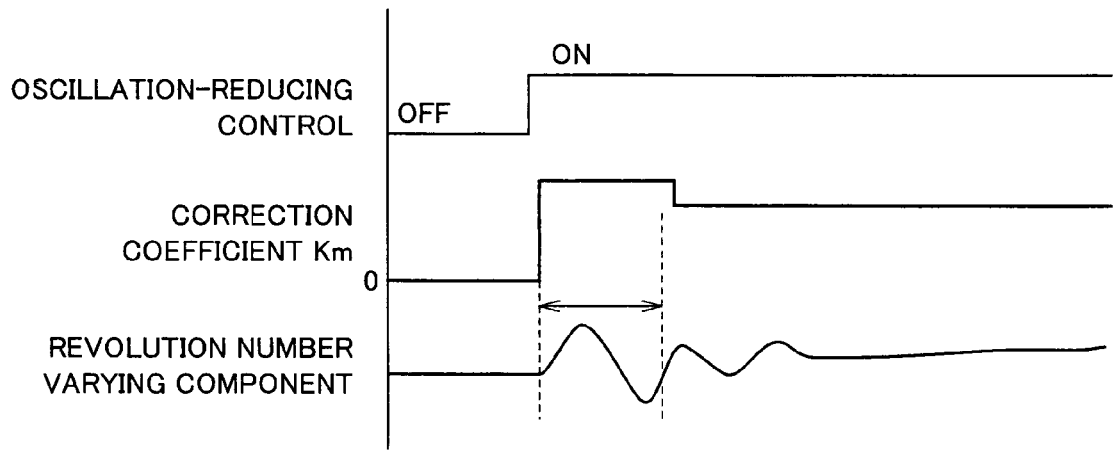
FIG. 14 is a timing chart illustrating oscillation-reducing control according to a fourth embodiment of the present invention.

FIG. 14 is a timing chart illustrating the oscillation-reducing control according to a fourth embodiment of the present invention.

Referring to FIG. 14, motor revolution number varying component ΔMRN2 of motor revolution number MRN2 is the maximum at the early stage of occurrence of oscillations. The reason therefor is that the force serving as trigger causing the oscillations is the maximum immediately after the start of the oscillations. The force gradually decreases after it reaches the maximum at the early stage of the occurrence of oscillations.

As shown in FIG. 14, oscillation-reducing control means 501 performs the oscillation-reducing control in response to occurrence of variations in motor revolution number MRN. Specifically, based on revolution number varying component ΔMRN2, oscillation-reducing control means 501 generates oscillation-reducing torque Δtr0 and multiplies the toque by correction coefficient Km to calculate final oscillation-reducing torque Δtr.

In the present embodiment, correction coefficient Km is set to a relatively large value in a predetermined period of time immediately after the occurrence of oscillations. The predetermined period of time corresponds to the period of time in which revolution number varying component ΔMRN is relatively large and corresponds to substantially one cycle of the resonance frequency band of motor revolution number varying component ΔMRN.

Further, after this predetermined period, correction coefficient Km is set to a value (one for example) that is a value under normal oscillation-reducing control. The correction coefficient is set in the above-described manner since, if correction coefficient Km is set to a relatively large value in the whole period in which the oscillations occur, the vehicle's behavior would adversely be affected undesirably in a period in which variations in revolution number is small.

According to the fourth embodiment of the present invention, at an early stage of the occurrence of oscillations in which the force exerted on the drive motor reaches the maximum value, a relatively large oscillation-reducing torque is generated and accordingly, variation in revolution number can be attenuated in a shorter period of time and the effects of the oscillation-reducing control can further be enhanced.

Fifth Embodiment

As described above in connection with the first embodiment, the oscillation-reducing control accurately sets the drive torque to a torque command value and thereby reduces variation of the control in the transition state. Therefore, as a control mode of AC motor M1, the PWM control that is superior in control response is employed.

Usually, the motor drive apparatus further includes a voltage step-up converter (not shown) connected between DC power supply B and inverter 12 shown in FIG. 1. The voltage step-up converter steps up a DC voltage from the DC power supply so that the output voltage (corresponding to input voltage Vm of the inverter) reaches a target voltage, and supplies the resultant voltage to the inverter.

Here, it is effective, for enhancement of system efficiency of the motor drive apparatus, to stop the voltage step-up operation of the voltage step-up converter to reduce power loss of the voltage step-up converter. Output voltage Vm of the voltage step-up converter decreases as the voltage step-up operation is stopped. Accordingly, as a control mode of motor generators MG1, MG2, the overmodulation control or rectangular-wave control that is large in voltage utilization factor is applied.

Figure 15:
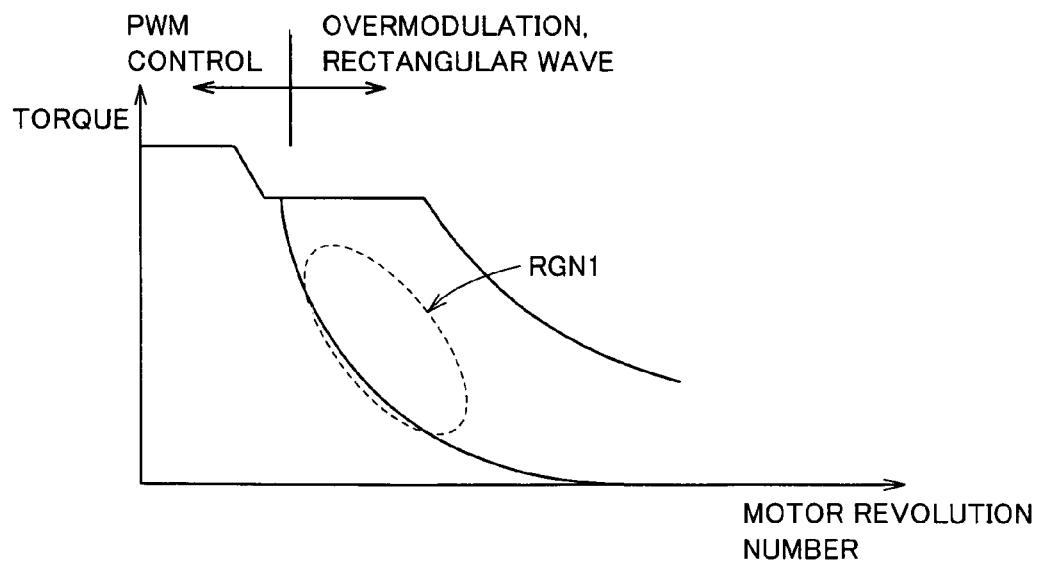
FIG. 15 shows a relation between torque and motor revolution number MRN2 of a motor generator MG2 when a voltage step-up converter is stopped.

FIG. 15 shows a relation between the torque and motor revolution number MRN2 of motor generator MG2 when the voltage step-up converter is stopped.

As shown in FIG. 15, as the voltage step-up converter is stopped, the region where the overmodulation or rectangular-wave control is applied is expanded (corresponding to region RGN1 in FIG. 15). The system efficiency is thus enhanced. However, in region RGN1 corresponding to the expanded region, the oscillation-reducing control is difficult to perform. Therefore, if the drive torque of motor generator MG2 suddenly changes as occurring upon engine start, large vibrations of the vehicle occur.

Then, in the present embodiment, in order to simultaneously achieve enhancement of the system efficiency and reduction of vehicle's variations, a voltage step-up operation is performed to increase input voltage Vm of the inverter in the state where the engine is started that is accompanied by large variation in drive torque. Accordingly, the control mode of motor generator MG2 is changed to the PWM control so that inverter control circuit 40 can carry out the oscillation-reducing control. In contrast, after the engine is started, the voltage step-up converter is stopped to reduce input voltage Vm of the inverter. Accordingly, the control is changed to the overmodulation or rectangular-wave control having high voltage utilization factor to improve system efficiency.

Figure 16:
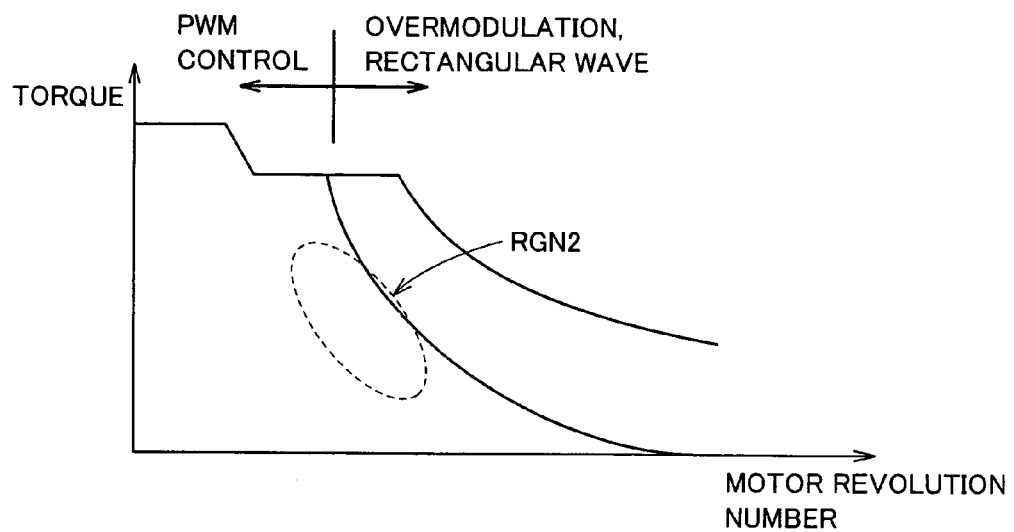
FIG. 16 shows a relation between torque and motor revolution number MRN2 of motor generator MG2 when the voltage step-up converter is operated.

FIG. 16 illustrates a relation between the torque and motor revolution number MRN2 of motor generator MG2 when the voltage step-up converter is operated.

Referring to FIG. 16, as the voltage step-up converter is operated, input voltage Vm of the inverter increases to expand the region to which the PWM control is applied (corresponding to RGN2 in FIG. 16). In this region RGN2, the oscillation-reducing control can be carried out and thus vibrations of the vehicle occurring at the engine start can be reduced.

In the present embodiment, input voltage Vm of the inverter may be increased by one of the following methods. Specifically, input voltage Vm of the inverter may be increased while the modulation factor is monitored so as not to allow the control mode of AC motor M1 to be changed to the overmodulation control, or a target voltage of the voltage step-up converter may be kept at the maximum voltage of the motor drive apparatus until the engine start is completed. When any of the methods is used, influence on the system efficiency is merely a reduction in efficiency in a short period of time between an instruction to start the engine and the completion of the engine start and thus there is substantially no influence on the fuel economy when the vehicle is actually running.

According to the fifth embodiment of the present invention, when the amount of variation in drive torque is relatively large, the PWM control region is expanded to expand the region to which the oscillation-reducing control is applied. When the amount of variation in drive torque is relatively small, the region of the overmodulation control or the rectangular-wave control is expanded. Thus, high system efficiency as well as superior ride comfort can be achieved.

Sixth Embodiment

As described above in connection with the second to the fifth embodiment, the oscillation-reducing control is performed when the amount of variation in drive torque is relatively large and the oscillation-reducing control is stopped when the amount of variation in drive torque is small. Accordingly, the maximum effects of the oscillation-reducing control can be achieved.

Figure 17:
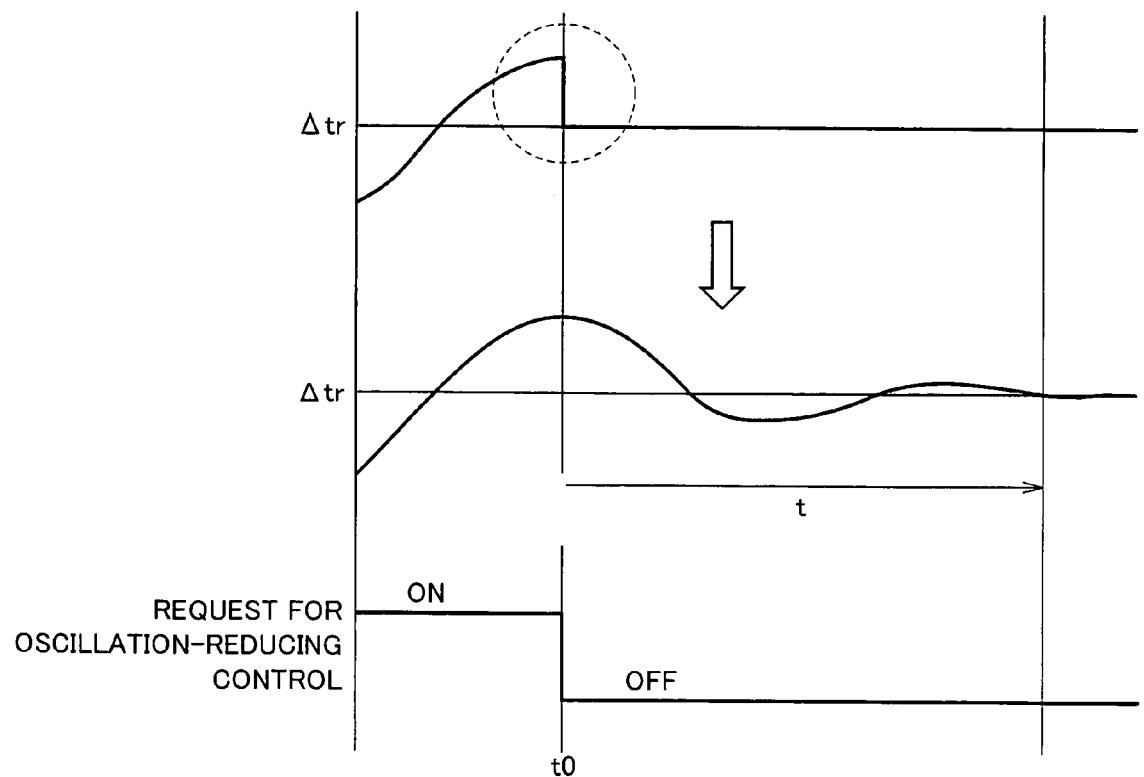
FIG. 17 is a timing chart illustrating an oscillation-reducing control operation according to a sixth embodiment of the present invention.

However, when a switch is made, depending on the amount of variation in drive torque, between the mode in which the oscillation-reducing control is performed and the mode in which the oscillation-reducing control is stopped, oscillation-reducing torque Δtr has a discontinuous portion that is the region indicated by the dotted line at the top of FIG. 17 when the switch is made. In particular, when the switch is made from the mode where the oscillation-reducing control is performed to the mode where the oscillation-reducing control is stopped and revolution number varying component ΔMR2 remains in motor revolution number MRN2, a stepped portion of the drive torque is generated since oscillation-reducing torque Δtr is suddenly removed from torque command value TR2, and thus the vehicle's behavior could be deteriorated.

In order to eliminate the discontinuous portion of oscillation-reducing torque Δtr, it is necessary that oscillation-reducing torque Δtr is smoothly attenuated in the transition stage in which the mode is changed from performance of the oscillation-reducing control to stop thereof.

Then, in the present embodiment, in the transition state in which the mode is changed from the one in which the oscillation-reducing control is performed to the one in which the oscillation-reducing control is stopped, a correction is made to allow oscillation-reducing torque Δtr to smoothly become zero. Specifically, oscillation-reducing torque correction unit 62 shown in FIG. 8 makes a correction to gradually decrease oscillation-reducing torque Δtr0 in a predetermined period of time t from the time of switching between ON and OFF of the control request. Predetermined period of time t corresponds to substantially one cycle of the resonance frequency band of revolution number varying component ΔMRN2 of motor revolution number MRN2.

Figure 18:
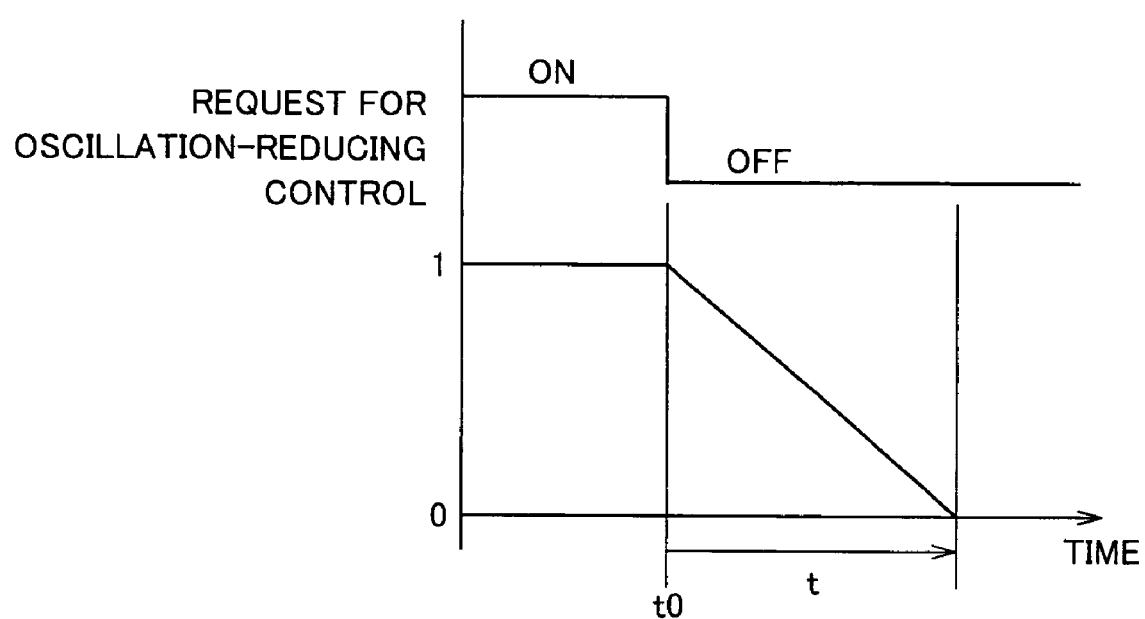
FIG. 18 is a waveform chart of correction coefficient Km.
Figure 19:
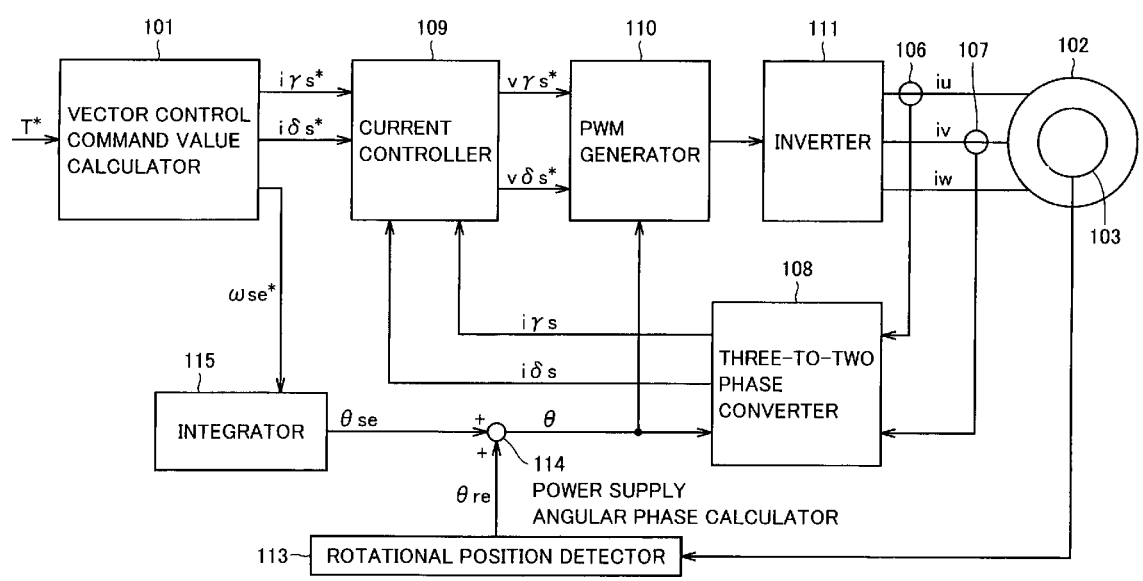
FIG. 19 is a schematic block diagram of a current control apparatus of an AC motor disclosed in Japanese Patent Laying-Open No. 09-238492.

FIG. 18 is a waveform chart of correction coefficient Km.

Referring to FIG. 18, correction coefficients Km is one in the period in which the request for the oscillation-reducing control is ON. In predetermined period t starting from the time (time t0) at which the request for the oscillation-reducing control is changed from ON to OFF, correction coefficient Km gradually decreases from one to zero.

Oscillation-reducing torque correction unit 62 multiplies oscillation-reducing torque Δtr0 by correction coefficient Km in FIG. 18 to calculate final oscillation-reducing torque Δtr. The calculated oscillation-reducing torque Δtr, as shown in the middle of FIG. 17, gradually decreases in the predetermined period from the time when the request for the oscillation-reducing control is made OFF to finally become zero.

According to the sixth embodiment of the present invention, in the stage in which the mode is changed between the one in which the oscillation-reducing control is executed and the one in which the oscillation-reducing control is stopped, the oscillation-reducing torque is gradually decreased and thus occurrence of the stepped portion of the drive torque can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor drive apparatus comprising:
   a first drive circuit driving a first motor; and
   a drive circuit control circuit controlling said first drive circuit so that said first motor outputs a torque according to a requested torque, wherein
   said drive circuit control circuit includes
   control mode switching means for switching control mode of said first motor between PWM control mode, overmodulation control mode and rectangular-wave control mode, according to a modulation factor of said first drive circuit, and
   oscillation-reducing control means for generating, when the control mode of said first motor is said PWM control mode, an oscillation-reducing torque for reducing oscillations of the torque that is output from said first motor and adding said oscillation-reducing torque to said requested torque to provide the resultant sum as a new requested torque,
   said control mode switching means switches the control mode of said first motor from said PWM control mode to said overmodulation control mode in response to the fact that the modulation factor of said first drive circuit exceeds a first predetermined value, and
   said oscillation-reducing control means gradually decreases said oscillation-reducing torque in a period in which the modulation factor of said first drive circuit changes from a second predetermined value that is smaller than said first predetermined value to reach said first predetermined value.

2. The motor drive apparatus according to claim 1, wherein
   said oscillation-reducing control means includes:
   generation means for generating said oscillation-reducing torque based on a varying component of the number of revolutions of said first motor;
   first correction means multiplying said generated oscillation-reducing torque by a first correction coefficient that varies according to the modulation factor of said first drive circuit, for correcting said oscillation-reducing torque; and
   addition means for adding said corrected oscillation-reducing torque to said requested torque to provide the resultant sum as a new requested torque.

3. The motor drive apparatus according to claim 2, wherein
   said first correction coefficient gradually decreases as the modulation factor of said first drive circuit gradually increases from said second predetermined value toward said first predetermined value.

4. The motor drive apparatus according to claim 3, wherein
   said first correction means has a first correction coefficient map defining said first correction coefficient as gradually decreasing as the modulation factor of said first drive circuit gradually increases, and extracts, from said first correction coefficient map, a value of said first correction coefficient that corresponds to the modulation factor of said first drive circuit for correcting said oscillation-reducing torque.

5. The motor drive apparatus according to claim 2, wherein
   said first motor is a motor generating a drive torque exerted on drive wheels of a vehicle, and
   said oscillation-reducing control means further includes second correction means multiplying said generated oscillation-reducing torque by a second correction coefficient that varies according to a state of said vehicle, for correcting said oscillation-reducing torque.

6. The motor drive apparatus according to claim 5, wherein
  said oscillation-reducing control means further includes vehicle state detection means for detecting the state of said vehicle based on an amount of variation of said drive torque, and
  said second correction means multiplies said generated oscillation-reducing torque by said second correction coefficient that varies according to the amount of variation of said drive torque, for correcting said oscillation-reducing torque.

7. The motor drive apparatus according to claim 6, wherein
  said second correction coefficient increases, under the condition that the amount of variation of said drive torque exceeds a predetermined value, as the amount of variation of said drive torque increases.

8. The motor drive apparatus according to claim 7, wherein
  said second correction coefficient increases stepwise or continuously as the amount of variation of said drive torque increases.

9. The motor drive apparatus according to claim 7, wherein
  said second correction coefficient is substantially zero when the amount of variation of said drive torque is at most said predetermined value.

10. The motor drive apparatus according to claim 9, wherein
  said second correction coefficient gradually decreases in a predetermined period starting from the time when the amount of variation of said drive torque changes to at most said predetermined value.

11. The motor drive apparatus according to claim 7, wherein
  when the amount of variation of said drive torque is at most said predetermined value, said addition means provides said requested torque as the new requested torque without performing said addition of said corrected oscillation-reducing torque to said requested torque.

12. The motor drive apparatus according to claim 6, wherein
  said second correction coefficient is set to a relatively large value in a predetermined period starting from the time when said drive torque starts to vary and set to a relatively small value after said predetermined period.

13. The motor drive apparatus according to claim 12, wherein
  said predetermined period corresponds to a period of substantially one cycle of a resonance frequency band of the varying component of the number of revolutions of said first motor.

14. The motor drive apparatus according to claim 6, further comprising a second drive circuit driving a second motor that starts or stops an internal combustion engine, wherein
  said vehicle state detection means detects the amount of variation of said drive torque based on at least one of a requested torque of said first drive circuit, a requested torque of said second drive circuit and an amount of variation of a requested torque of said internal combustion engine.

15. The motor drive apparatus according to claim 14, further comprising a voltage converter performing voltage conversion between a power supply and said first and second drive circuits, wherein
  said voltage converter steps up a power supply voltage, according to an instruction to start said internal combustion engine, so that the modulation factor of said first drive circuit is at most said first predetermined value, and
  said control mode switching means switches the control mode of said first motor to said PWM control mode in response to the fact that the modulation factor of said first drive circuit changes to at most said first predetermined value.

* * * * *